US008756225B1

(12) United States Patent
Lipkin et al.

(10) Patent No.: US 8,756,225 B1
(45) Date of Patent: Jun. 17, 2014

(54) METHOD AND SYSTEM FOR INTERFACING WITH A BACK END SERVER APPLICATION THROUGH A MESSAGING ENVIRONMENT

(75) Inventors: Daniel Lipkin, Foster City, CA (US); Sanjay Parmar, Foster City, CA (US); Srinivas Panuganti, San Jose, CA (US); Tuck Chang, Mountain View, CA (US)

(73) Assignee: Saba Software, Inc., Redwood Shores, CA (US)

( * ) Notice: Subject to any disclaimer, the term of this patent is extended or adjusted under 35 U.S.C. 154(b) by 312 days.

(21) Appl. No.: 11/143,975

(22) Filed: May 31, 2005

(51) Int. Cl.
*G06F 7/00* (2006.01)
*G06F 17/30* (2006.01)

(52) U.S. Cl.
USPC .......................................... 707/726; 709/203

(58) Field of Classification Search
USPC .................... 707/1, 10, 100; 709/201, 217
See application file for complete search history.

(56) References Cited

U.S. PATENT DOCUMENTS

| | | | | |
|---|---|---|---|---|
| 5,721,825 | A * | 2/1998 | Lawson et al. | 709/203 |
| 5,828,882 | A * | 10/1998 | Hinckley | 719/318 |
| 6,094,681 | A * | 7/2000 | Shaffer et al. | 709/224 |
| 6,134,658 | A * | 10/2000 | Multerer et al. | 713/175 |
| 6,167,448 | A * | 12/2000 | Hemphill et al. | 709/224 |
| 6,416,328 | B1 * | 7/2002 | Callahan | 434/322 |
| 6,477,548 | B1 * | 11/2002 | Nihei | 707/204 |
| 6,490,574 | B1 * | 12/2002 | Bennett et al. | 706/47 |
| 6,584,502 | B1 * | 6/2003 | Natarajan et al. | 709/224 |
| 6,587,668 | B1 * | 7/2003 | Miller et al. | 434/350 |
| 6,594,466 | B1 * | 7/2003 | Harned et al. | 434/350 |
| 6,652,283 | B1 * | 11/2003 | Van Schaack et al. | 434/236 |
| 6,769,010 | B1 * | 7/2004 | Knapp et al. | 709/203 |
| 6,807,577 | B1 * | 10/2004 | Gillespie et al. | 709/227 |
| 6,892,307 | B1 * | 5/2005 | Wood et al. | 726/8 |
| 6,907,455 | B1 * | 6/2005 | Wolfe et al. | 709/217 |
| 6,938,076 | B2 * | 8/2005 | Meyer et al. | 709/219 |
| 6,976,164 | B1 * | 12/2005 | King et al. | 713/156 |
| 6,988,138 | B1 * | 1/2006 | Alcorn et al. | 709/225 |
| 7,113,933 | B1 * | 9/2006 | Imholte | 707/1 |
| 7,330,817 | B1 * | 2/2008 | Exall et al. | 705/321 |
| 2001/0001143 | A1 * | 5/2001 | Jones et al. | 705/1 |
| 2002/0059373 | A1 * | 5/2002 | Boys | 709/204 |
| 2002/0059380 | A1 * | 5/2002 | Biliris et al. | 709/206 |
| 2002/0064766 | A1 * | 5/2002 | Cozens et al. | 434/350 |
| 2002/0118583 | A1 * | 8/2002 | Nakazono | 365/200 |

(Continued)

FOREIGN PATENT DOCUMENTS

EP 1542479 A1 * 6/2005

OTHER PUBLICATIONS

Authentication protocol providing user anonymity and untraceability in wireless mobile communication systems, Park et al., Computer Networks, 44, pp. 267-273, 2004.*

*Primary Examiner* — Augustine K Obisesan

(57) ABSTRACT

A method and system for supporting interaction with a back end server application through a messaging environment. Specifically, the method determines when an event occurs. The event allows for an action, in response to the event, to be taken by a user within the back end server application. A notification message is generated informing the user of the event. The notification message is rendered to comply with a format supporting the messaging environment. The notification message that is rendered enables the user to take the action within the back end application without having the user directly open the back end server application. The rendered notification message is sent to an electronic device associated with the user to facilitate interfacing between the user and the back end server application.

33 Claims, 13 Drawing Sheets

(56) References Cited

U.S. PATENT DOCUMENTS

| | | |
|---|---|---|
| 2002/0129354 A1* | 9/2002 | Bryan et al. .................. 717/176 |
| 2002/0138325 A1* | 9/2002 | Mashimo et al. ................. 705/8 |
| 2002/0188607 A1* | 12/2002 | Kogut-O'Connell et al. .. 707/10 |
| 2003/0002634 A1* | 1/2003 | Gupta et al. ............... 379/88.13 |
| 2003/0009602 A1* | 1/2003 | Jacobs et al. .................. 709/318 |
| 2003/0055699 A1* | 3/2003 | O'Connor ........................ 705/7 |
| 2003/0110215 A1* | 6/2003 | Joao .............................. 709/203 |
| 2003/0142797 A1* | 7/2003 | Troy et al. ................. 379/88.12 |
| 2003/0154254 A1* | 8/2003 | Awasthi ........................ 709/206 |
| 2003/0172077 A1* | 9/2003 | Moussavian .................. 707/100 |
| 2003/0187925 A1* | 10/2003 | Inala et al. .................... 709/204 |
| 2003/0232315 A1* | 12/2003 | Pfund ............................ 434/350 |
| 2004/0002958 A1* | 1/2004 | Seshadri et al. .................. 707/3 |
| 2004/0015549 A1* | 1/2004 | Saruhashi et al. ............ 709/204 |
| 2004/0033475 A1* | 2/2004 | Mizuma et al. ................ 434/219 |
| 2004/0044736 A1* | 3/2004 | Austin-Lane et al. ......... 709/206 |
| 2004/0073601 A1* | 4/2004 | Darago et al. ................. 709/201 |
| 2004/0088177 A1* | 5/2004 | Travis et al. ....................... 705/1 |
| 2004/0098459 A1* | 5/2004 | Leukert-Knapp et al. .... 709/224 |
| 2004/0153508 A1* | 8/2004 | Alcorn et al. ................. 709/205 |
| 2004/0153509 A1* | 8/2004 | Alcorn et al. ................. 709/205 |
| 2004/0172320 A1* | 9/2004 | Spellman et al. ................. 705/8 |
| 2004/0181581 A1* | 9/2004 | Kosco ........................... 709/206 |
| 2004/0230661 A1* | 11/2004 | Rashid et al. ................. 709/207 |
| 2005/0055238 A1* | 3/2005 | Wisnosky et al. ................ 705/1 |
| 2005/0108030 A1* | 5/2005 | Kim ................................. 705/1 |
| 2005/0177730 A1* | 8/2005 | Davenport et al. ........... 713/182 |
| 2005/0181775 A1* | 8/2005 | Rideout et al. ............. 455/414.3 |
| 2005/0195076 A1* | 9/2005 | McCulloch et al. .......... 340/500 |
| 2005/0209914 A1* | 9/2005 | Nguyen et al. ................. 705/14 |
| 2006/0136933 A1* | 6/2006 | Jensen et al. .................. 719/318 |

\* cited by examiner

500A

| Notification Message | | | | | |
|---|---|---|---|---|---|
| From: | Administration | | | | |
| To: | User | | | | |
| Cc: | | | | | |
| Subject: | Update Your Goal Progress | | | | |

| My Goals: Title | Status | Percent Complete | Start | End |
|---|---|---|---|---|
| Testing Review 2 | New | 0 | 3/1/2002 | 10/31/2005 |
| Test 65 | New | 0 | 3/30/2004 | 3/30/2004 |

Notification Message

| | |
|---|---|
| From: | Administration |
| To: | User |
| Cc: | |
| Subject: | Update Your Goal Progress |

Goal Details: Testing Review 2

My Goals

| | |
|---|---|
| Title: | Testing Review 2 |
| Assignment: | User |
| Category: | Quality |
| Start Date: | 3/1/2002 |
| End Date: | 10/31/2005 |

SMART METRICS:

| | |
|---|---|
| Starting Amount: | 0 |
| Target Amount: | 0 |

| Notification Message | |
|---|---|
| From: | Administration |
| To: | User |
| Cc: | |
| Subject: | Update Your Goal Progress |

Goal Details: Testing Review 2

My Goals

Title:  Testing Review 2
Status:  [Revised ▼]

Percent Complete:  [10 ▼]

Comments:  [On Track Now]

Reported By:  User

| Childelement Name | | | Required | Value |
|---|---|---|---|---|
| deepLink | | | Yes | Meta-Data for the Deep Link |
| | name | | Yes | Name of the Deep link |
| | mainPage | | Yes | Page to be displayed |
| | menuItem | | Yes | Menu to be activated |
| | fixedParameters | | No | Specific parameters for the page |
| | param | | No | Parameter for the page. |
| | | name | Yes | Name of the param |
| | | value | Yes | Value for the param. |

Fig. 9

METHOD AND SYSTEM FOR INTERFACING WITH A BACK END SERVER APPLICATION THROUGH A MESSAGING ENVIRONMENT

BACKGROUND OF THE INVENTION

1. Field of the Invention

Embodiments of the present invention relate to the field of back end server applications. More particularly, embodiments of the present invention relate generally to providing an automatic interface between a back end server application that is a human resources management application and a user through a messaging environment.

2. Related Art

Human resources management applications provide a platform to manage administrative costs in areas such as delivering training, tracking performance, invoicing, and other related professional services. The human resources management applications improve administrative efficiencies by assessing gaps in current skills and certifications of employees of a corporation, plan training to close those gaps, improve learning of employees through training offerings, and improve performance of the employees.

Typically, deployment of a human resource management application is centralized to allow administrators across a corporation to quickly access human resource data. However, progress reporting of employees within the human resource application can be a tedious process. An administrator, or employee, needs to log into the human resource application, navigate to the correct page or screen, and update the progress of each entry individually.

As such, the user must have knowledge of the human resource application in order to effectively navigate to the correct screen for interacting with the human resource application. This is problematic when users (e.g., employees of a corporation) who are not especially familiar with the system are asked to track progress for a particular goal (e.g., sales goals) assigned to that user. As a result, users who have a difficult time navigating through the human resource application may choose not to use the human resource application to track their progress, thereby nullifying the benefits provided by the human resource application to the corporation.

SUMMARY OF THE INVENTION

A method and system for supporting interaction with a back end server application through a messaging environment. Specifically, in accordance with one embodiment of the present invention, the method determines when an event occurs. Occurrence of the event is monitored within the back end server application. For instance, an event may consist of the passing of a date requiring an update or report of the goals of an employee of a corporation. The event allows for an action, in response to the event, to be taken by a user within the back end server application.

A notification message is generated informing the user of the event. The notification message is rendered to comply with a format supporting the messaging environment. For example, the format may support an e-mail messaging environment, or a calendaring environment. The rendered notification message enables the user to take the action within the back end application without having the user directly open the back end server application. That is, the user is presented access to the particular screen or page that is used for interfacing with the user in order to service the action taken by the user. The rendered notification message is sent to an electronic device associated with the user to facilitate interfacing between the user and the back end server application.

In accordance with another embodiment of the present invention, a system for interfacing with a back end server application through a messaging environment is disclosed. The system includes a notification module for generating a notification message informing a user of an event. The notification module also tracks or monitors the occurrence of the event. Occurrence of the event allows for a response or action, in response to said event, to be taken by a user within the back end server application. For example, when the event is the passing of a date for requiring updates for goal progress of an employee of a corporation, the action taken by the employee is to update his or her goal progress within the back end server application.

The system also includes a rendering module. The rendering module renders the notification message in such a way to comply with a format supporting the messaging environment. That is, the notification is presented to the user within messaging environment, such as within an e-mail. In addition, the notification message that is rendered enables the user to take the action without having the user directly open the back end server application. That is, the user is seamlessly presented with an interface to the back end application directly through the messaging environment.

In addition, the system also includes an authentication module. The authentication module automatically authenticates the user with the back end server application to provide to the user seamless access to the back end server application. For example, in one embodiment, the authentication module relies on the authentication by the messaging environment for the user to provide authentication to the back end server application for the user. In another embodiment, an authentication certificate is provided within the notification message that is rendered. When interfacing with the back end server, the certificate is automatically presented for authentication.

BRIEF DESCRIPTION OF THE DRAWINGS

FIG. 5A is a screen shot illustrating an e-mail informing a user that a goal progress update is required, and enabling the user to update associated goals within a back end server application within an inline frame providing active content of the back end server application within the e-mail message, in accordance with one embodiment of the present invention.

FIG. 5B is a screen shot illustrating an e-mail providing details of a specific goal within the inline frame of FIG. 5A, in accordance with one embodiment of the present invention.

FIG. 5C is a screen shot illustrating an e-mail enabling the user to update associated goals within the inline frame of FIG. 5A, in accordance with one embodiment of the present invention.

FIG. 9 is a chart that illustrates the parameters of a particular deep link, in accordance with one embodiment of the present invention.

DETAILED DESCRIPTION OF THE INVENTION

Reference will now be made in detail to the preferred embodiments of the present invention, a method and system for interfacing with a back end server application through a messaging environment, examples of which are illustrated in the accompanying drawings.

Accordingly, various embodiments of the present invention disclose a method and system for supporting interaction with a back end server application that is pushed onto a user of the system. That is, information is presented to a user automatically at an appropriate time within a messaging environment. The message that is presented also enables the user to take action within the back end server application without having the user directly open the back end server application. As a result, embodiments of the present invention provide timely and seamless interfacing with a back end server application.

NOTATION AND NOMENCLATURE

Figure 1:
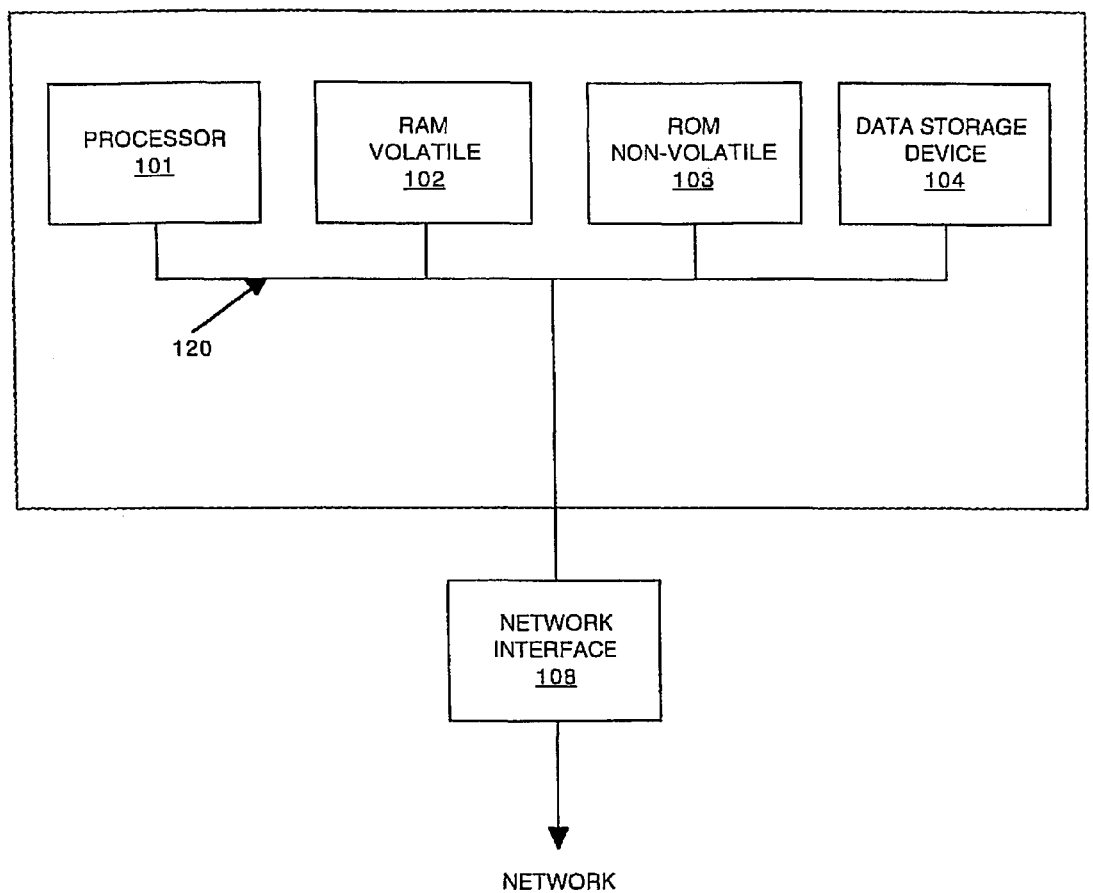
FIG. 1 is a block diagram of an electronic device that is capable of providing an interface with a back end sever application through a messaging environment, in accordance with one embodiment of the present invention.

Referring now to FIG. 1, portions of the present invention are comprised of computer-readable and computer-executable instructions which reside, for example, in computer-readable media of an electronic system that are capable of accessing networked devices, such as, a server computer, mainframe, networked computer, workstation, hub, router, switch, firewall, access server, and the like. FIG. 1 is a block diagram of interior components of an exemplary electronic system 100, upon which embodiments of the present invention may be implemented.

Exemplary electronic system 100 includes an address/data bus 120 for communicating information, a central processor 101 coupled with the bus 120 for processing information and instructions, a volatile memory 102 (e.g., random access memory (RAM), static RAM dynamic RAM, etc.) coupled with the bus 120 for storing information and instructions for the central processor 101, and a non-volatile memory 103 (e.g., read only memory (ROM), programmable ROM, flash memory, EPROM, EEPROM, etc.) coupled to the bus 120 for storing static information and instructions for the processor 101.

Exemplary electronic system 100 also includes an optional data storage device 104 (e.g., cache memory, memory card, hard drive, etc.) coupled with the bus 120 for storing information and instructions. Data storage device 104 is removable, in one embodiment. With reference still to FIG. 1, a network interface 108 (e.g., signal input/output device) is provided which is coupled to bus 120 for providing a communication link between electronic system 100 and a network environment. As such network interface 108 enables the central processor unit 101 to communicate with or monitor other electronic systems (e.g., networked devices) or coupled to a communication network.

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "determining," "generating," "rendering," "sending," "authenticating," or the like, refer to the actions and processes of a computer system, or similar electronic computing device, including an embedded system, that manipulates and transforms data represented as physical (electronic) quantities within the computer system's registers and memories into other data similarly represented as physical quantities within the computer system memories or registers or other such information storage, transmission or display devices.

Figure 2:
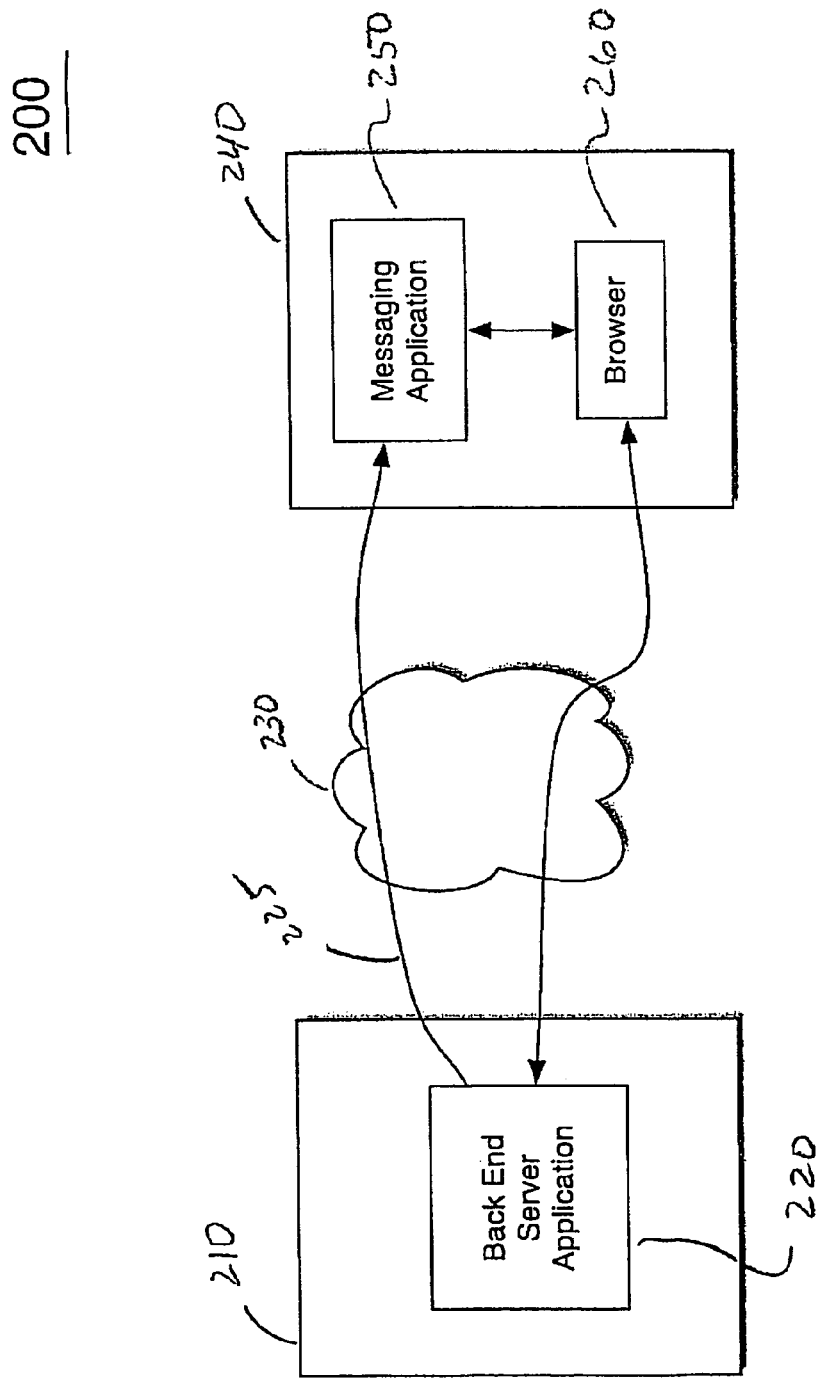
FIG. 2 is block diagram illustrating a network that is capable of providing an interface with a back end server application through a messaging environment, in accordance with one embodiment of the present invention.

Now referring to FIG. 2, a network 200 is shown that is capable of providing an interface with a back end server application, in accordance with one embodiment of the present invention. As shown in FIG. 2, the network 200 includes a communication network 230, such as the internet, for facilitating communication between the back end server 210 and the electronic device 240 associated with a user (not shown).

The back end server 210 provides a centralized access to the back end server application 220 for a plurality of users, such as human resource administrators or employees of a corporation. The back end server application 220 provides management functionality through an integrated internet-based platform to manage learning of employees, content of databases, performance of employees, talent assessment of employees, and collaboration between employees of a corporation. For instance, the back end server application can track progress of specified goals (e.g., sales goals) of an employee or a group of employees of a corporation, or to manage the scheduling of an employee who is performing tasks to complete a certificate, and other business related services.

As shown in FIG. 2, the back end server application 220 is able to generate messages within a messaging environment. The messages that are generated are pushed or sent to the user across path 225 to prompt the user to take some action within the back end server application. As shown in FIG. 2, the message is sent from the back end server application 220 across path 225 to the messaging application 250 supported by the electronic device 240 associated with a user (e.g., employee, manager, administrator, etc.).

The message complies with a format of the messaging environment. For example, in one embodiment, the message complies with an e-mail format that is supported by an e-mail messaging environment. In another embodiment, the message complies with a calendaring format that is supported by a calendaring environment. The messaging application 250 at the electronic device 240 allows the user to read the message and interface with the back end server application through the message.

In one embodiment, the message enables the user to interface with the back end server application 220 through a browser. More specifically, the messaging application is able to launch a browser application 260 within the electronic device 240 when the user indicates that an interaction with the back end server 210 is necessary. As such, the messaging application is able to open a browser application 260 which communicates with the back end server application 220 through the internet 230 to retrieve the corresponding web page that allows the user to interface with the back end server application 220. In one embodiment, the web page is integrated back within the message. For instance the web page is contained as active content within an inline frame of the message.

Figure 3:
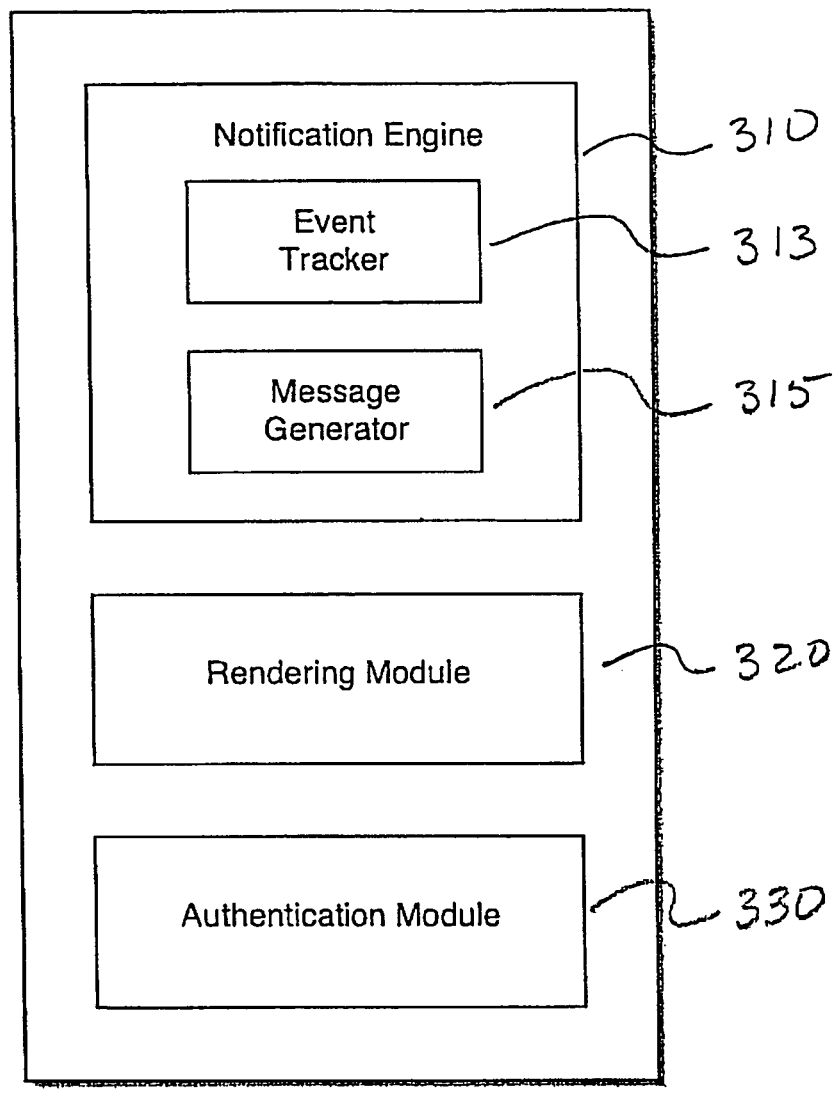
FIG. 3 is a block diagram of a system that is capable of interfacing with a back end server application through a messaging environment, in accordance with one embodiment of the present invention.

FIG. 3 is a block diagram of a system 300 that is capable of providing an interface with a back end server application through a messaging environment, in accordance with one embodiment of the present invention. As an example, the system 300 is implemented within the back end server 210 of FIG. 2 to provide an interface between a user and the back end server application 220. For instance, the back end server application is a human resource management application, in one embodiment. The system 300 includes a notification engine 310, a rendering module 320, and an authentication module 330.

The notification engine 310 includes an event tracker 313 and a message generator 315. In general, the notification engine 310 generates a notification message informing the user of an event. The event allows for, or requires, an action to be taken by the user in response to the event. The action is executed within the back end server application. Various examples of events and follow-on actions that are taken by the user are presented in FIGS. 5A-C and 6A-C.

The event tracker 313 monitors the data within the back end server application to determine the occurrence of the event. Various events include, as an example, the passing of a periodic date requiring updating or review of goals assigned to various users of the back end server application that are associated with a corporation.

In addition, the message generator 315 generates the notification message that notifies the user of the event. The message generator 315 is invoked though a java action, in one embodiment, in response to the event. That is, for each event (e.g., a periodic event), a pre-defined java action is responsible for generating the content of the notification message, and for sending the notification message to the user through the messaging environment.

The rendering module 320 renders the notification message to comply with a format supporting the messaging environment. That is, the rendering module 320 transforms the notification message to be compatible with the messaging environment. For example, the notification message complies with an e-mail messaging format that is supported within an e-mail messaging environment, in one embodiment. In another embodiment, the notification message complies with a calendaring format that is supported within a calendaring environment, in one embodiment.

In one embodiment, the notification message that is rendered enables the user to take an action within the back end server application. More specifically, the notification message enables the user to interface with the back end server application to perform the action in response to the event without having the user directly open the back end server application.

In one embodiment, the interface is accomplished by including an IFRAME element as defined by the hypertext markup language (HTML) that describes an inline frame for the inclusion of external objects within the notification message. In the present embodiment, the external object is the web page of the back end server that provides an interface with the user to perform the action in response to the event.

In another embodiment, the interface is accomplished by including a deep link to a web page within the notification message. In the present embodiment, the web page of the back end server provides an interface with the user to perform the action in response to the event.

In still another embodiment, an action button is provided within the notification message. The action button when invoked accesses a web page of the back end application. In one embodiment, the active button invokes a deep link to the web page. The web page services the action to be taken by the user. In addition, active content from the web page is displayed through an inline frame of the message, in one embodiment.

The system 300 also includes an authentication module 330. The authentication module 330 automatically authenticates the user with the back end server application to enable direct interfacing with the back end server application. That is, the authentication module enables the user to have seamless access to the back end server application.

Figure 4:
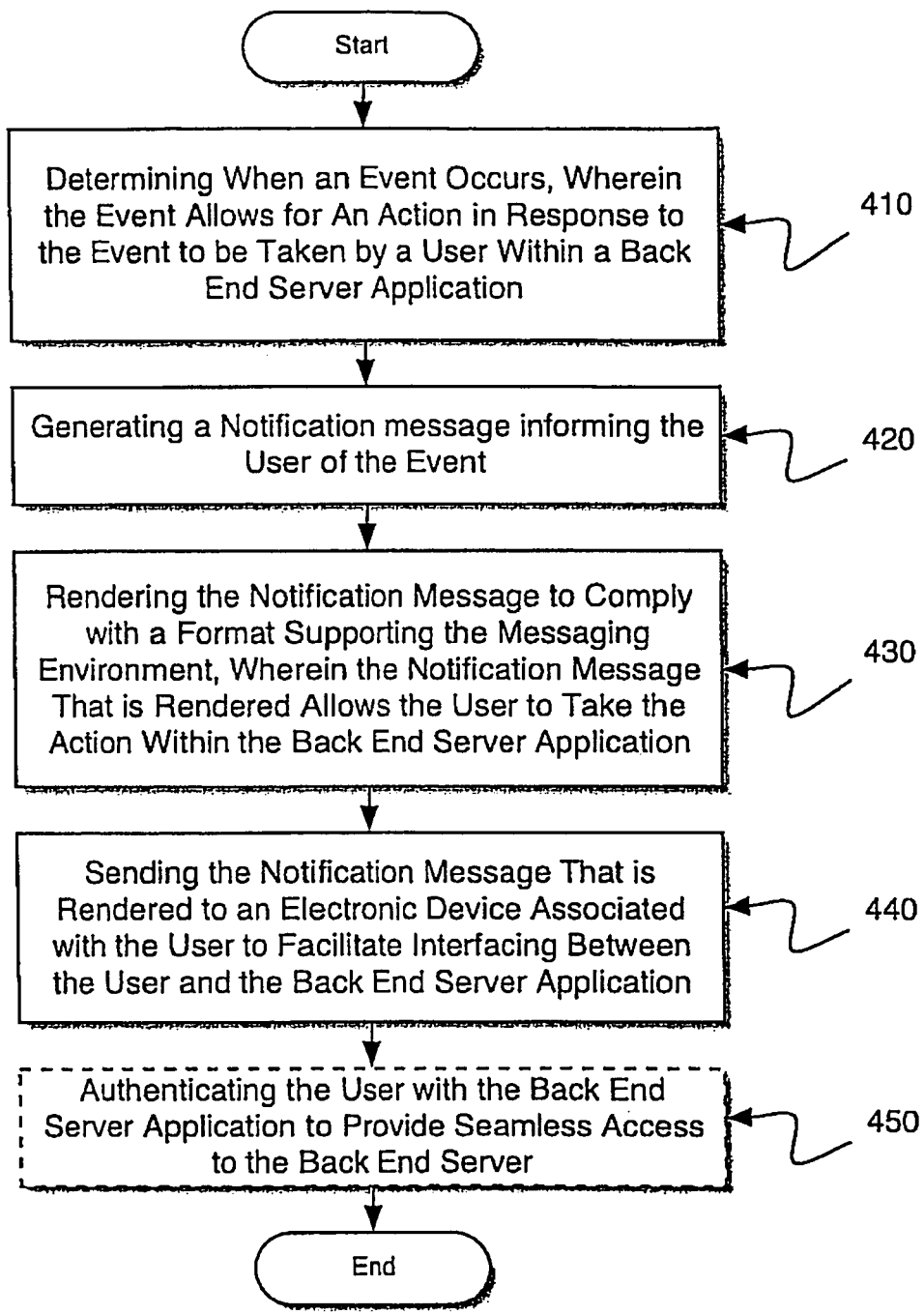
FIG. 4 is a flow chart illustrating steps in a computer implemented method for interfacing with a back end server application through a messaging environment, in accordance with one embodiment of the present invention.

Referring now to FIG. 4, a flow chart 400 is described illustrating steps in a computer implemented method for interfacing with a back end server application through a messaging environment, in accordance with one embodiment of the present invention. The present embodiment provides for the timely prompting of the user to take some action through a notification message in the messaging environment. In addition, the present embodiment provides for seamless interfacing directly to the correct user interface, screen, page of the back end server to service the user's actions that are taken in response to the notification message.

At 410, the present embodiment determines when an event occurs. More specifically, the event triggers a response by a user of the back end server. That is, the event allows for an action to be taken by the user in response to the event.

For example, in a goal oriented management environment, certain goals that define a purpose toward which an endeavor is directed are tracked to determine the progress of the goal. As such, at periodic intervals, these goals are reviewed and updated by the user associated with those goals. The present embodiment, determines when the periodic event has occurred, such as, the passing of a 1 or 2 week interval.

In a learning oriented environment, certain learning tasks are pushed onto the user at pre-designated times. For example, if the user is trying to obtain a certificate, a number of tasks need completion before qualifying for the certificate. The present embodiment is able to determine when the event occurs that indicates that a learning task is necessary to be performed, such as the completion of a class toward certificate completion.

At 420, the present embodiment generates a notification message informing the user of the event. More specifically, the notification message provides details as to the event, and determines the appropriate list of actions to be taken by the user in response to the event.

The present embodiment also identifies the user from a plurality of users supported by the back end server. That is, the user and group of users associated with the event are identified. Thereafter, the present embodiment, determines the message address for each of the users identified so that the notification message can be sent to those users.

At 430, the present embodiment renders the notification into a format that complies with the messaging environment. That is, the present embodiment transforms the notification message into a format compatible with the messaging environment. For example, the format is an e-mail format to be used within an e-mail messaging environment, in one embodiment, or the format is a calendaring format to be used within a calendaring environment, in another embodiment.

As such, the present embodiment is able to provide a seamless interface to the back end server. More specifically, the notification message that is rendered enables the user to take the action, that is in response to the event. The action is taken directly within the back end application without having the user directly open the back end server application. That is, the user is presented with the correct web page, or screen, or user interface in the back end server application within the body of the notification message so that the user can directly interface with the back end sever application to accomplish the required action.

In one embodiment, during the rendering process, an action button for accessing a web page that services the action taken by the user in response to the event is provided in the message. More specifically, active content from the web page is displayed through an inline frame (e.g., IFRAME) of the message when the button is invoked or engaged.

In another embodiment, during the rendering process, a deep link to a web page of the back end server is provided. The web page services the action taken by the user in response to the event.

At 440, the present embodiment, sends the notification message that is rendered to an electronic device associated with the user. As such, the present embodiment facilitates the direct interfacing between the user and the back end server application through the notification message.

At 450, the present embodiment optionally provides for automatic authentication of the user with the back end server. Automatic authentication enables seamless access by the user to the back end server application. In that way, the user need not navigate through a log-in process that authenticates the user with the back end server.

Various embodiments are implemented to enable the automatic authentication of the user with the back end server. In one embodiment, the authentication is provided from the authentication process used by the user within the messaging environment. That is, once the user is authenticated within the messaging environment, the user is also authenticated within the back end server application. As such, when the user opens the notification message, the user is automatically authenticated with the back end server application.

In another embodiment the authentication is provided in a web server single-sign-on process. That is, the back end server application performs the authentication for the user. As such, the user need not type in a username/password in the message in order to view the content.

In still another embodiment, the authentication is provided by an auto-login process. That is, the user can enable the auto login process that automatically logs the user into the back end server whenever the user is accessing the back end server. More specifically, a business rule is implemented for the auto-login process, in one embodiment. If the business rule is "ON", a "Remember Me" option is provided in the login screen. As such, when the "Remember Me" option is selected by the user, the present embodiment presents the login screen with the username/password pre-filled in the screen. Thereafter, the user need only click the "GO" button to log into the back end server application.

In still another embodiment, the authentication is provided in a certificate based process. More specifically, an authentication certificate is embedded in a deep link universal resource locator (URL) that automatically authenticates the user. That is, the certificate is included within the notification message that is sent to the user. A return to the back end server through the notification message will include the certificate.

As long as the certificate is valid, the user accessing the back end server application is authenticated. That is, upon detection of the certificate, the back end server application bypasses the standard login process. As such, the user is given access to the back end server application.

On the other hand, if the certificate has expired when the user presents the certificate, a login screen is presented to the user, in accordance with one embodiment of the present invention.

To implement the certificate used for authentication, one embodiment of the present invention uses an API for generating the certificate for the user. This API can only be used for the user to whom the notification including the certificate was sent. The API will throw an exception when another user tries to use the certificate.

In accordance with one embodiment of the present invention, two business rules are implemented to support the certificate based authentication process. The business rules are domain based, in one embodiment. In another embodiment, the business rules are non-domain based. A first rule enables the embedded certificate in a deep link. The second rule provides an "expiration time" for the certificate. After the time has expired, the certificate is invalid.

FIGS. 5A, 5B, and 5C are screen shots of notification messages created in response to events within a goals oriented environment, in accordance with embodiments of the present invention. That is, events occur that are associated with the tracking, generation, and review of goals. As described previously, goals are objectives or purposes towards which an endeavor is directed. For example, goals are sales marks to be reached, metrics defining a percentage of qualified employees holding a certificate, etc. The goals can be associated with one or more users. Notification messages requesting an update to the goals are presented only to users associated with those goals. Progress of the goals describes how far along a goal is.

Turning now to FIG. 5A, a screen shot 500A is shown illustrating an e-mail informing a user that a goal progress update is required, in accordance with one embodiment of the present invention. More specifically, the screen shot 500A of the e-mail message was generated in response to a periodic event that is used to track progress of at least one goal of the user. For example, the event is the passing of a time interval (e.g., one week, two weeks, one month, six months).

As shown in FIG. 5A, a notification message is presented to the user. The notification message is sent from the administration to the user. The subject of the message is "Update Your Goal Progress." As such, the intention of the notification message is to prompt the user to update associated goals.

The notification message in the screen shot 500A includes an inline frame 505 that provides an interface to the back end server application. That is, the present embodiment enables the user to update associated goals within a back end server application within an inline frame (e.g., IFRAME) 505 that provides active content of the back 25, end server application of the notification message. That is, the inline frame 505 provides the interface to the specific web page of the back end server for updating goal progress.

As shown in FIG. 5A, a list of goals is presented to the user without the user having to log into the back end server application. The list of goals is presented to the user within the e-mail message and presents the most recently updated list of goals. Two goals are listed associated with the user: "Testing Review 2" and "Test 65." For each of the goals listed, a start date and an end date is provided for tracking progress of the goals.

Additionally, the screen shot includes a percentage completed that quickly informs how much of the goal has been accomplished. As show in FIG. 5A, progress of the two goals, "Testing Review 2" and "Test 65," is still at the beginning stage.

Also, instructions for the user in the form of page text can be provided within the notification message of FIG. 5A. The instructions tell users how to update their goals.

Further, clicking on the title brings up a read-only goal detail page. More specifically, the e-mail notification message essentially contains embedded HTML that, when rendered by an e-mail client, permits the content to be viewed essentially as a web page. For example, by clicking on the title, "Testing Review 2," the page represented by screen shot 500B of FIG. 5B is presented to the user within the same notification message as presented in FIG. 5A. That is, the inline frame 505 is updated to include the active content from the back end server application that provides the details of the "Testing Review 2" goal.

As shown in FIG. 5B, the title of the goal is presented, the assignment to the user is presented, the category of the goal is presented, the start and end dates are presented within the detailed description of the goal. In addition, smart metrics can be provided within the description of the goal. As shown in FIG. 5B, the details are presented in a read-only format, in one embodiment. The user can navigate back to the previous screen shot 500A by clicking on the "My Goals" breadcrumb.

Moreover, clicking on the status of the entry for each of the goals will bring up a popup window in the notification message that permits the updating of the goal progress for the entry selected. For example, clicking on the status of "Testing Review 2," the page represented by screen shot 500C of FIG. 5C is presented to the user within the same notification message as presented in FIG. 5A. That is, the inline frame 505 is updated to include the active content from the back end server application that provides the interface for updating the "Testing Review 2" goal.

As shown in FIG. 5C, the "Status" of the goal, "Testing Review 2," can be updated or edited. Selection of the proper "Status" is enabled through the drop down button. Also, a "Percent Complete Block" is editable. In addition, a "Comments" block is included within the screen shot 500C to allow the user to enter comments related to the "Testing Review 2" goal.

Figure 6A:
FIG. 6A is a screen shot illustrating an e-mail informing a user of a newly created class that is targeted to the user and enabling the user to directly register for the class, in accordance with one embodiment of the present invention.

Turning now to FIG. 6A, a screen shot 600A is shown illustrating an e-mail informing a user that a singular event has occurred that requires a corresponding action to be taken by the user, in accordance with one embodiment of the present invention. For example, the singular event can be used to promote learning of the user. That is, prescribed learning is pushed onto the user. More specifically, the screen shot 600A of the e-mail message was generated in response to the singular event that pushes an action item upon the user. For example, to keep on track in completing the courses required for obtaining a certificate, the present embodiment is able to push the next training class required onto the user through a notification e-mail.

As shown in FIG. 6A, the screen shot 600A includes a notification message that is presented to the user. The notification message is sent from the administration to the user. The subject of the message is "New Offering Has Been Created." For example, a new class has been created that is applicable for the user to attend to complete training for a certificate. As such, the intention of the notification message is to prompt the user to consider registering for the class. Specifically, the notification message was created in response to an event that includes an offer for a created class, such as a prescribed class needed to satisfy training for a certificate.

As shown in FIG. 6A, a notification message is presented to the user. The notification message is sent from the administration to the user. The subject of the message is "New Offering Has Been Created." As such, the intention of the notification message is to prompt the user to register for the class.

Details of the class are also provided in the notification message of screen shot 600A. For example, the title of the class is presented, that the class is instructor led is presented, the start and end dates are presented, and a drop policy is represented in the notification message of screen shot 600A. In addition, the notification message also indicates that a manager approval is required.

The notification message in the screen shot 600A includes an action button that facilitates an interface to the back end server application that registers the user for the class. For example, the "Class A" may be a prescribed class assigned to user within a particular time period. As such, the notification message enables the user to register for the prescribed class through a web page of the back end application. In one embodiment, this web page is presented by invoking the register button 605. In another embodiment the user is automatically registered for the class by invoking the register button 605.

In still another embodiment, the notification message provides access to a web page displaying a catalogue of classes applicable to the user. For instance, the web page is presented to the user in the notification message as active content in an inline frame, in one embodiment. The web page of the back end server enables the user to register for any selected class in the catalogue.

Figure 6B:
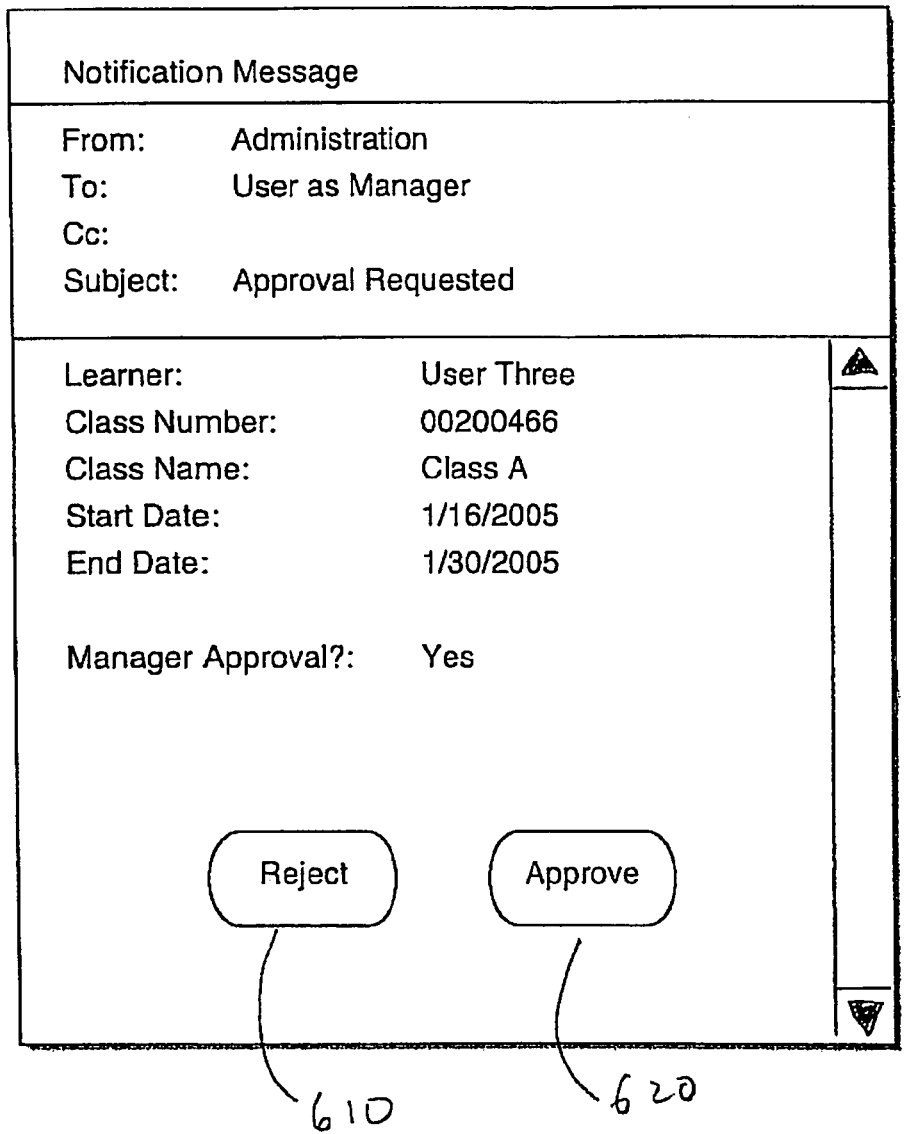
FIG. 6B is a screen shot illustrating an e-mail informing a manager that a learner under the supervision of the manager has registered for a class that requires the manager's approval, and enabling the manager to either grant or deny approval, in accordance with one embodiment of the present invention.

Turning now to FIG. 6B, a screen shot 600B is shown illustrating an e-mail informing a manager that a singular event has occurred that requires a corresponding action to be taken by the manager, in accordance with one embodiment of the present invention. For example, the singular event is the registration of a class by User Three supervised by the manager. More specifically, the screen shot 600B of the e-mail message was generated in response to registration of the class by the User Three.

As shown in FIG. 6B, a notification message is presented to the user. The notification message is sent from the administration to the user as manager. The subject of the message is "Approval Required." As such, the intention of the notification message is to prompt the user manager to grant or deny approval.

As shown in FIG. 6B, the screen shot includes information relevant to giving or denying approval for the User Three to take the class. For example, the user name (User Three) who registered for the class is presented, the class number is presented, the class name is presented the start and end dates are presented to the manager for use in assessing whether User Three should take the class at this particular time.

The notification message in the screen shot 600B includes action buttons that facilitates an interface to the back end server application that can register User Three for the class. That is, the present embodiment provides a rejection button 610 for denying authorization to register for the class by the User Three. By invoking the rejection button 610, the present embodiment automatically prevents User Three from registering for the "Class A."

In addition, the present embodiment provides an approve button 620 for approving authorization to register for the class by User Three. By invoking the approve button 620, the present embodiment automatically registers User Three into the "Class A." The necessary procedures for enrolling User Three into the "Class A" are performed, and a confirmation is sent to User Three.

Figure 6C:
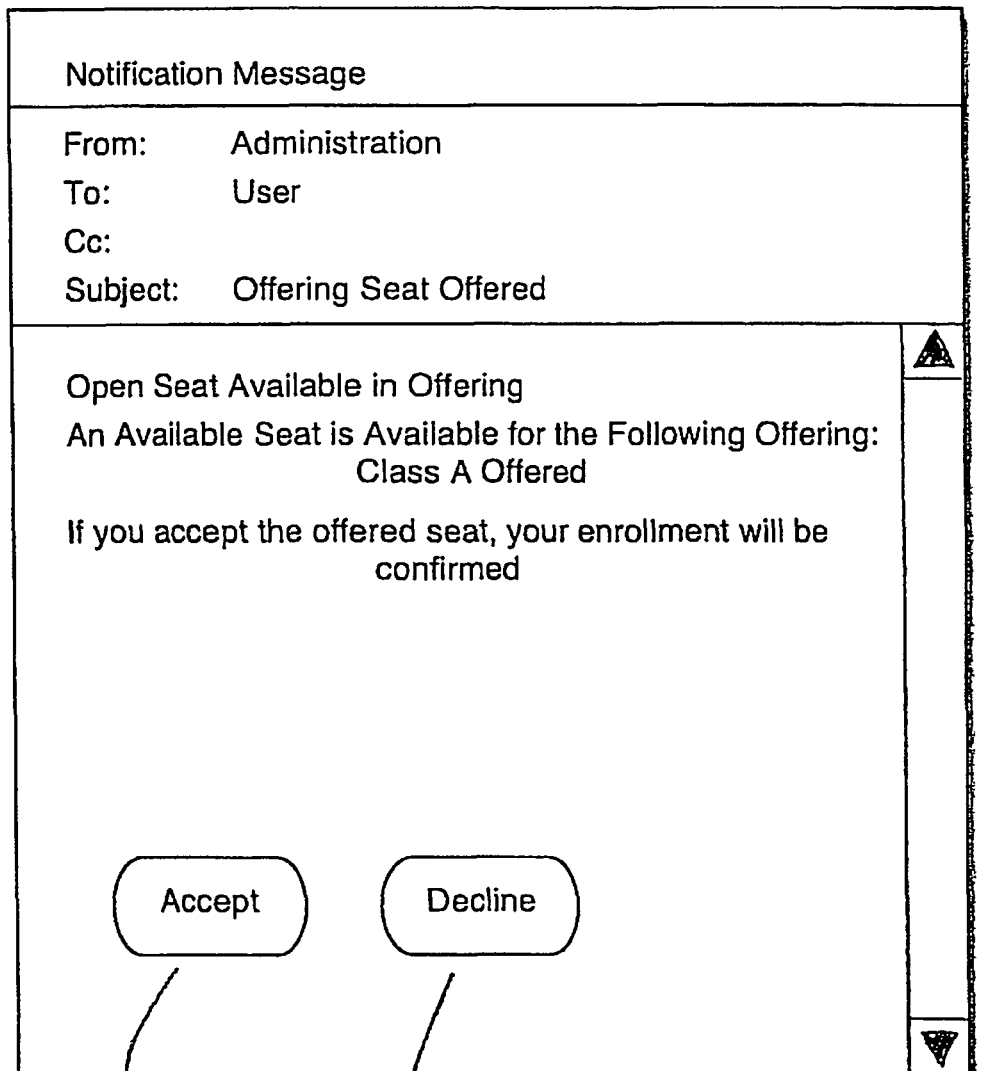
FIG. 6C is a screen shot illustrating an e-mail informing a user that an opening is available for a class for which the user was on a waitlist for registration, and enabling the user to register for the class, in accordance with one embodiment of the present invention.

Turning now to FIG. 6C, a screen shot 600C is shown illustrating an e-mail informing a user that a singular event has occurred that requires a corresponding action to be taken by the user, in accordance with one embodiment of the present invention. For example, the singular event is the opening of a class seat in "Class A." More specifically, the screen shot 600C of the e-mail message was generated in response to an opening on a waitlist for a class, wherein the user is listed on the waitlist.

As shown in FIG. 6C, a notification message is presented to the user. The notification message is sent from the administration to the user. The subject of the message is "Offering Seat Offered." As such, the intention of the notification message is to prompt the user to register for a class.

As shown in FIG. 6C, the notification message in the screen shot 600C includes action buttons that facilitates an interface to the back end server application that can register the user for the class. That is, the present embodiment provides an accept button 630 for accepting registration to the class by the user. By invoking the accept button 630, the present embodiment automatically registers the user for the "Class A," in one embodiment. In another embodiment, invoking the accept button 630 provides access to a web page on the back end server that enables the user to register for "Class A." In addition, the present embodiment provides a decline button 640 for declining registration for "Class A" by the user.

In still another embodiment, the event that occurs is an offer for registration to a prescribed web based training class (WBT). In this case, the notification message includes information that describes the WBT class to educate the user in making a decision to register for the class or to decline registration.

The present embodiment provides a deep link to the WBT class that automatically launches the WBT class. For example, an "Accept" button is presented to the user in the notification message for accepting registration of the WBT class. When the user invokes the "Accept" button, the deep link is invoked. As such, the WBT class is automatically launched and presented to the user.

Figure 7:
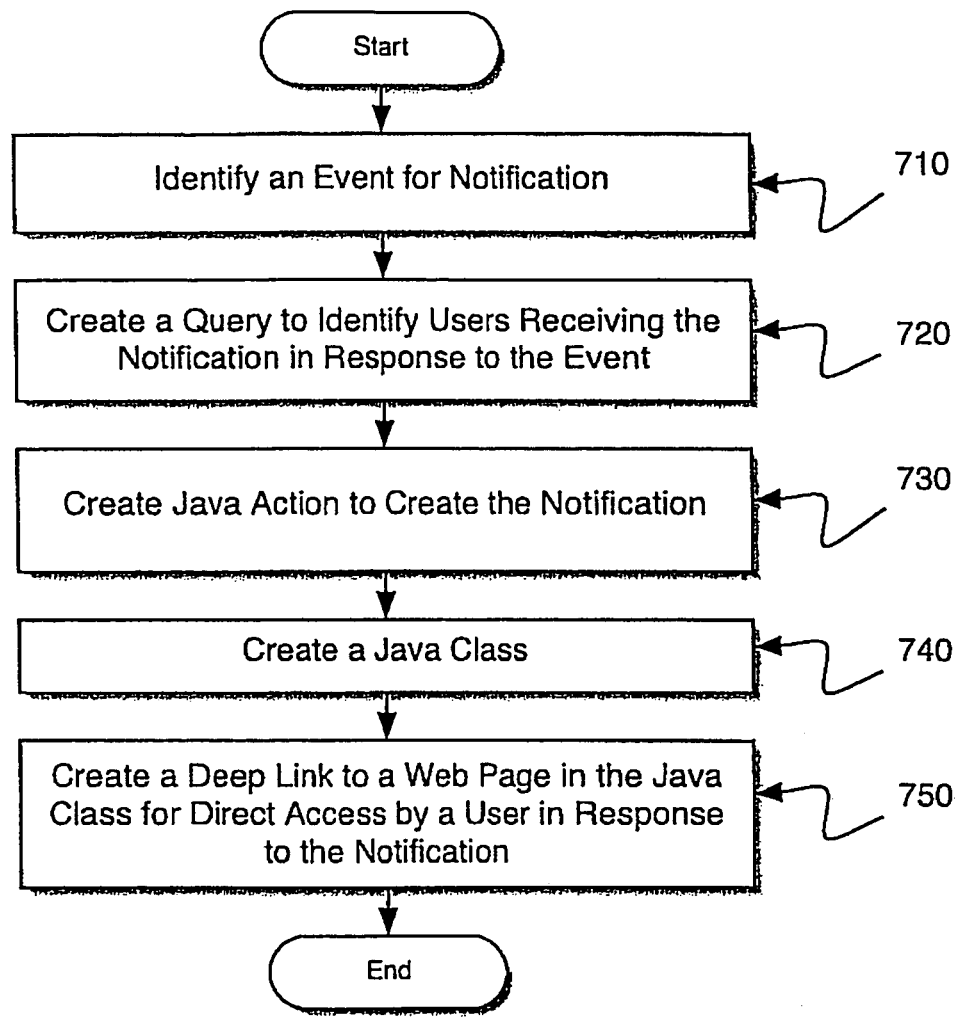
FIG. 7 is a flow chart illustrating steps in a method for generating a notification in response to an event, in accordance with one embodiment of the present invention.

FIG. 7 is a flow chart 700 illustrating steps in an exemplary method for registering an event and generating an I-frame notification in response to the event, in accordance with one embodiment of the present invention. FIG. 7 in combination with Tables 1-3 provide an example of the generation of a particular notification, "Goal Progress Email". The flow chart 700 is implemented within a database environment, and in one embodiment, the database is accessed using a structured query language (SQL).

At 710, the present embodiment identifies an event that is recorded within the database. That is, details of the event are provided to the notification engine (e.g., engine 310) that is driven off database tables so that the event can be monitored. In addition, the present embodiment generates a notification of the event in response to the event.

Table 1 is an exemplary pseudo code for identifying and monitoring an event within a database as implemented at 710, as follows. In particular, an event is identified by title as "Goal Progress Email." The pseudo code calls a database stored procedure to create a row in a table to register the identified event. The pseudo code of Table 1 provides details of the event, such as a unique identifier "nevnt000000000006073", a description, etc.

TABLE 1

Identifying an Event

```
#REM ------------------------------------------------
#REM Event No --> 60073
#REM ------------------------------------------------
exec fgp_notify_event_temp_ins ('nevnt000000000006073', 'ts', 0,
'0010000000', 'Goal Progress Email', 60073, 'This event will send
Email about the Goal Progress', 'cpobj000000000006046', 'ts'
, 'local000000000000001');
insert into fgt_notify_event_category (
    id, event_id, category, time_stamp
) values (
    'nevtc000000000006073', 'nevnt000000000006073', 'Goal', 'ts'
);
#REM ------------------------------------------------
#REM Periodic Function --> Goal Progress Email
#REM ------------------------------------------------
insert into fgt_periodic_function (
    id, time_stamp, statement_id, event_id, flags, time_interval,
    frequency, weekly_mask, monthly_mask, name,
    start_time, end_time, trigger_time, last_run, start date, end_date
) values (
    'prdfn000000000006018', ':', 'nffnc000000000006063',
'nevnt000000000006073', '0010100000', null,
    1, '1000000', null, 'Goal Progress Email',
    to_date ('01/Jan/1900 09:30', 'DD/MM/YYYY HH24:MI'), null, null,
null, sysdate, null
);
```

At 720, the present embodiment creates a query for the event that searches for associated users. That is, the query returns the identifiers (id's) of the user to whom the notification (e.g., an E-mail) is sent. As such, the notification engine (e.g., engine 310) will query a database to select the users to whom the notification will be sent.

Table 2 is an exemplary pseudo code for associating the query to be used with the notification event at 720 of flow chart 700, in accordance with one exemplary embodiment of the present invention, as follows.

TABLE 2

Generation of a Query

```
#REM ------------------------------------------------
#REM Named Query to send Goal Progress Emails
#REM ------------------------------------------------
insert into fgt_notify_func (
    id, time_stamp, name, type, sql_id, description
) values (
```

TABLE 2-continued

Generation of a Query

'nffnc000000000006063', 'ts', 'Goal Progress Email', 1, 6077, 'Goal
Progress Email'
);
insert into fgt_notify_query_map (
  id, time_stamp, type, event_id, query_id
) values (
  'nqmap000000000007074', 'ts', 2, 'cpobj000000000006046',
'nffnc000000000006063'
);

At 730, the present embodiment creates a java action that is invoked by the notification engine (e.g., engine 310) when the event occurs. In the present embodiment, the notification engine executes a java code.

Table 3 is an exemplary pseudo code for creating the java action at 730 of flow chart 700, in accordance with one exemplary embodiment of the present invention, as follows. As shown in Table 3, once the notification engine (e.g., engine 310) discovers an event, the "GoalProgressJavaACtion" java code is invoked.

TABLE 3

Creating a Java Action exec fgp_notify_action_ins('nfact0000000000000601', 'ts', 'Send Email
about the Goal Progress', 'Send Email about the Goal Progress', 3,
'nevnt000000000006073', 'domin000000000000001', 1, null,
'1000000000', 'ts', 'local000000000000001');
insert into fgt_notify_java_strategy (
  id, time_stamp, name, description,
  classname, action_id
) values (
  'nfstr000000000000601', 'ts', 'executeAction', 'default
method description',
  'com.saba.goal.notify.javaaction.GoalProgressJavaAction',
'nfact000000000000601'
);

At 740, the present embodiment creates the java class called at 730 of flow chart 700. For example, the java class of the example illustrated in Tables 1-3 is the "GoalPrgressJavaAction" class. In one embodiment, the java class created extends from the "OutlookNotifyJavaAction" super class, as will be described more fully below in relation to Table 5.

At 750, the present embodiment creates a deep link to the web page that is utilized in the java class created at 740. The deep link provides a user direct access to the web page for interfacing, in response to the notification. At 750, if the web page has not been generated, the web page can also be generated through any web page generation technique.

Table 4 is an exemplary pseudo code for an interface including a method that identifies a java class that can be called from the database, in accordance with one embodiment of the present invention. More specifically, the pseudo code in Table 4 is an interface for which all notification, execute actions implement. That is, the notification engine (e.g., engine 310) calls up the method of Table 4 for an interface to call various execute action methods.

TABLE 4

Generating an Interface package com.saba.notify;
import com.saba.exception.SabaException;
import com.saba.locator.ServiceLocator;
/**
 * <p>Interface for which all notification actions must implement.

TABLE 4-continued

Generating an Interface

*
 * notification action is called when a certain event occurs in the
 * Saba system. Saba provides a number of pre-installed
notification
 * actions; in addition, you can write new ones and have them be
 * called by the system.
 *
 * <p>To add a new notification action, follow this procedure:
 *
 * <ol><li>Write a Java class which implements the {@link
 * IJavaNotificationAction} interface. Install the class in the
Saba
 * application server's class path.
 * <li>Using the Saba System Administration application, the system
 * administrator associates the notification action with a
particular
 * event. The system administrator identifies the action by its
 * fully-qualified class name.
 * <li>Whenever the event occurs, Saba creates a fresh instance of
 * the object, then calls the object's {@link
 * #executeAction} method. After that method returns, Saba
destroys
 * the object.</ol>
 *
 */
public interface IJavaNotificationAction {
  /**
   * Method which Saba invokes when any associated event occurs.
   *
   * @param sourceId ID of the object that triggered the event.
   * @param sourceDomainId ID of the source object's domain.
   * @param locator Valid {@link ServiceLocator} object. You can
use
   * this to find any Saba services and create manager, home, and
   * reference objects. (The <code>ServiceLocator</code> contains
   * authentication information for this Saba session.)
   */
  public void executeAction ( String sourceId, String
sourceDomainId, ServiceLocator locator) throws SabaException;
}

Table 5 is an exemplary pseudo code for creating the class, "OutlookNotifyJavaAction", which is an abstract class that generally defines the category of actions that generate the notifications (e.g., I-frame), in accordance with one exemplary embodiment of the present invention, as follows. The "OutlookNotifyJavaAction" is a super class of these actions. In particular, the pseudo code of Table 4 includes key words for substituting information particular to the user receiving the notification for the key word. Also, the content of the e-mail is defined in Table 4. In addition, the java interface of Table 4 identifies the execute action. The execute action lists the recipients of the e-mail that are stored in a database. Thereafter, the pseudo code of Table 4 generates the e-mail for each of the users and sends the e-mail to the user. In the specific embodiment, the e-mail is generated through an "OutlookEmail.xml" code, as presented in Table 6, below.

The pseudo code of Table 5 retrieves the E-mail content for generating the E-mail at the section of the code with the string "getEmailContent". More specifically, the code provides for retrieving the deep link to the URL used in the e-mail, the certificate used to authenticate the user, the content of the e-mail, etc.

In addition, the pseudo code lists abstract methods that are implemented by the various notification methods. For example, abstract methods, such as, "Get the name of the Deep Link", "Get the Subject for the Email", etc. are defined.

Also, the pseudo code checks for the system preference of implementing the security features for authenticating a user who is accessing a web page through the notification. For example, the string of the code "addCertificateinfo" is used to define certificate information used to authenticate the user.

TABLE 5

"OutlookNotifyJavaAction" Class

```
*/
package com.saba.notify.javaaction;
import java.io.BufferedInputStream;
import java.io.ByteArrayInputStream;
import java.io.ByteArrayOutputStream;
import java.io.IOException;
import java.io.InputStream;
import java.io.OutputStream;
import java.io.StringWriter;
import java.util.ArrayList;
import java.util.HashMap;
import java.util.Iterator;
import java.util.List;
import java.util.Map;
import java.util.Vector;
import javax.activation.DataSource;
import com.saba.businessrules.BooleanPolicyType;
import com.saba.businessrules.BusinessRule;
import com.saba.businessrules.BusinessRuleManager;
import com.saba.businessrules.IBusinessRuleDataType;
import com.saba.businessrules.IntegerPolicyType;
import com.saba.domain.DomainHome;
import com.saba.exception.FatalException;
import com.saba.exception.PlatformMessage;
import com.saba.exception.SabaException;
import com.saba.locator.Delegates;
import com.saba.locator.ServiceLocator;
import com.saba.notify.IJavaNotificationAction;
import com.saba.notify.NotificationUtil;
import com.saba.notify.impl.JavaActionRecipients;
import com.saba.notify.impl.MailContent;
import com.saba.notify.javakeyword.DeepLinkURLGenerator;
import com.saba.party.Party;
import com.saba.party.PartyManager;
import com.saba.party.Person;
import com.saba.primitives.ContactInfoDetail;
import com.saba.primitives.NameDetail;
import com.saba.primitives.SecurityInfoDetail;
import com.saba.saba3.util.HtmlUtil;
import com.saba.security.SabaLogin;
import com.saba.util.Debug;
import com.saba.util.LocaleUtil;
import com.saba.util.StringUtil;
/**
  * This is the new abstract class we are going to add in the
system. This class is responsible for
  *      - generating the HTML
  *      - sending that HTML as inline content in the email
  * Application developer need to author one more java class,
which needs extend from this class for every email interaction.
Subclass of OutlookNotifyJavaNotifyAction needs to implement the
getDeepLinkName method.
  */
public abstract class OutlookNotifyJavaAction implements
IJavaNotificationAction
     {
         //identifier for replacing the deep link
         private static final String kDeeplLinkHolder = "@DEEPLINK";
         private static final String kEmailTitle = "@EMAILTITLE";
         private static final String kEmailText = "@EMAILTEXT";
         private static final String kFullName = "@FULLNAME";
         private static String mContent = null;
         private String mEventId=null;
         private String mActionId=null;
         /**
          * Default Constructor
          */
         public OutlookNotifyJavaAction( )
         {
             super( );
         }
         public OutlookNotifyJavaAction(String eventId, String
actionId)
```

TABLE 5-continued

"OutlookNotifyJavaAction" Class

```
         {
             super( );
             mEventId=eventId;
             mActionId=actionId;
         }
         /**
          * Send e-mails to Users
          *
          * @param sourceId id of the object for which the
notification is triggered
          * @param sourceDomainId id of the domain
          * @param locator reference to the service locator
          * @exception SabaException
          */
         public void executeAction(String sourceId, String
sourceDomainId, ServiceLocator locator) throws SabaException
             {
                 MailContent mailContent = null;
                 // If the source object is an event get the NotifyEvent
object and all the recipients for this object
                 List recipList = new Vector( );
                 if ( mEventId!=null && mActionId!=null) {
                     JavaActionRecipients jars=new
JavaActionRecipients(locator);
                     recipList=jars.getRecipients(mEventId,
mActionId, sourceId, sourceDomainId);
                 }
                 else {
                     recipList.add (sourceId);
                 }
                 //get the person
                 Iterator recpItr=recipList.iterator( );
                 while ( recpItr.hasNext( )) {
                     List mailContentList = new ArrayList (10);
                     List recipients = new ArrayList (10);
                     String personId=(String)recpItr.next( );
                     Person person = getRecipient(personId,
locator);
                     //mail content
                     mailContent = new MailContent(new
DeepLinkDataSource(LocaleUtil.convertStringToBytes(getEmailContent
(sourceId, sourceDomainId, person, locator)), "text/html"));
                     mailContentList.add(mailContent);
                     //get the email of the recipient
                     String eMail = getRecipientEmail(locator,
personId);
                     //set the recipient
                     recipients.add(eMail);
                     //send the e-mail
                     NotificationUtil.sendMail(locator, recipients,
getEmailSubject(locator), null, mailContentList);
                 }
             }
             /**
              * Get the name of the Deeplink
              * @return String
              * @throws SabaException
              */
             public abstract String getDeepLinkName( ) throws
SabaException;
             /**
              * Get the Subject for the Email
              * @param locator ServiceLocator
              * @return String
              * @throws SabaException
              */
             public abstract String getEmailSubject(ServiceLocator
locator) throws SabaException;
             /**
              * Get the Email Text
              * @param locator ServiceLocator
              * @return String
              * @throws SabaException
              */
             public abstract String getEmailText(ServiceLocator locator)
throws SabaException;
             /**
              * Get the Email Title
```

TABLE 5-continued

"OutlookNotifyJavaAction" Class

```
          * @param locator ServiceLocator
          * @return String
          * @throws SabaException
          */
         public abstract String getEmailTitle(ServiceLocator
    locator) throws SabaException;
         /**
          * Returns the id of the recipient
          *
          * @param sourceId - Notification Source Id
          * @param locator - Service Locator
          * @return - Recipient
          * @throws SabaException
          */
         protected Person getRecipient(String sourceId,
    ServiceLocator locator) throws SabaException{
             return (Person)
    ServiceLocator.getReference(sourceId);
         }
         /**
          * Send e-mails to Users
          *
          * @param sourceId id of the object for which the
    notification is triggered
          * @param sourceDomainId id of the domain
          * @param locator reference to the service locator
          * @exception SabaException
          */
         private String getEmailContent(String sourceId, String
    sourceDomainId, Person person, ServiceLocator locator) throws
    SabaException
         {
             String deepLink = null;
             InputStream inStream = null;
             BufferedInputStream bufInStream = null;
             StringWriter writer = new StringWriter(500);
             String content = null;
             //party manager
             PartyManager partyManager = (PartyManager)
    locator.getManager(Delegates.kPartyManager);
             //get the contactInfo
             NameDetail nameDetail = partyManager.getName(person);
             //generate the deep link information
             DeepLinkURLGenerator urlGenerator = new
    DeepLinkURLGenerator( );
             Iterator deepLinkInfo =
    urlGenerator.getKeywordValue(getDeepLinkName( ), sourceId, null,
    locator).iterator( );
             deepLink = (String) deepLinkInfo.next( );
             deepLink = addCertificateInfo(locator, sourceId,
    person, deepLink);
             if (mContent == null)
             {
                 try
                 {
                     inStream =
    this.getClass( ).getResourceAsStream("com/saba/notify/javaaction/outlook
    Email.xml");
                     if (inStream == null)
                     {
                         ClassLoader cl =
    Thread.currentThread( ).getContextClassLoader( );
                         inStream =
    cl.getResourceAsStream("com/saba/notify/javaaction/outlookEmail.xml");
                     }
                     bufInStream = new
    BufferedInputStream(inStream);
                     int ch;
                     while ((ch = bufInStream.read( )) != -1)
                     {
                         writer.write(ch);
                     }
                 }
                 catch(IOException e)
                 {
                     Debug.Trace("INFO:
    OutlookNotifyJavaAction.getEmailContent: Unable to Read the Resource
    File");
                     throw new FatalException("Problem Reading
    Resource File", e);
                 }
                 mContent = writer.toString( );
             }
             content = mContent.toString( );
             content = StringUtil.replace(content,
    kDeepLinkHolder, deepLink);
             content = StringUtil.replace(content, kEmailTitle,
    getEmailTitle(locator));
             content = StringUtil.replace(content, kEmailText,
    getEmailText(locator));
             content = StringUtil.replace(content, kFullName,
    nameDetail.getFname( ) + " " + nameDetail.getLname( ));
             return content;
         }
         /**
          * Get the E-Mail of the recipient
          * @param locator ServiceLocator
          * @param sourceId String
          * @return String
          * @throws SabaException
          */
         protected String getRecipientEmail(ServiceLocator locator,
    String sourceId) throws SabaException
         {
             PartyManager partyManager = (PartyManager)
    locator.getManager(Delegates.kPartyManager);
             Party party = (Party)
    ServiceLocator.getReference(sourceId);
             //get the contactInfo
             ContactInfoDetail infoDetail =
    partyManager.getContactInfo(party);
             return infoDetail.getEmail( );
         }
         /**
          * Add Certificate Information to the URL
          * @param locator ServiceLocator
          * @param sourceId String
          * @param deepLink String
          * @return String URL with Certificate if Business Rule is
    on
          * @throws SabaException
          */
         private String addCertificateInfo(ServiceLocator locator,
    String sourceId, Person person, String deepLink) throws SabaException
         {
             boolean includeCertificate = false;
             Integer expireTime = null;
             //party manager
             PartyManager partyManager = (PartyManager)
    locator.getManager(Delegates.kPartyManager);
             //get the Domain
             DomainHome domainHome = (DomainHome)
    locator.getHome(Delegates.kDomain);
             //get the BusinessRule Value
             BusinessRuleManager mgr = (BusinessRuleManager)
    locator.getManager(Delegates.kBusinessRuleManager);
             BusinessRule enableCertificateRule =
    mgr.findBusRule(20011);
             IBusinessRuleDataType bolPolType =
    mgr.getValue(enableCertificateRule, domainHome.findRootDomain( ));
             //get the boolean value
             Boolean polVal = (Boolean)
    bolPolType.getValue(BooleanPolicyType.kBooleanSubType, locator);
             if (polVal.booleanValue( ))
             {
                 includeCertificate = true;
                 BusinessRule expirationTime =
    mgr.findBusRule(20012);
                 IBusinessRuleDataType intPolType =
    mgr.getValue(expirationTime, domainHome.findRootDomain( ));
                 expireTime = (Integer)
    intPolType.getValue(IntegerPolicyType.kIntegerSubType, locator);
```

TABLE 5-continued

"OutlookNotifyJavaAction" Class

```
        }
        Map parameters = new HashMap(5);
        parameters.put(DeepLinkURLGenerator.kDeepLinkRedirect
, "false");
        if (includeCertificate)
        {
            if (expireTime == null)
            {
                throw new
SabaException(PlatformMessage.kCertificateExpireTime);
            }
            int expireValue = expireTime.intValue( ) * 24 *
60 * 60 * 1000;
            //get the contactInfo
            SecurityInfoDetail infoDetail =
partyManager.getSecurityInfo(person);
            String certificate =
SabaLogin.getCertificate(locator, infoDetail.getUsername( ),
expireValue);
            parameters.put(DeepLinkURLGenerator.kDeepLinkCe
rtificate, certificate);
        }
        String queryString =
HtmlUtil.createQueryString(parameters);
        /*
         *Problem: The queryString starts with the ? mark.
         *If variable deepLink contains the ?
mark then that breaks the deeplink url
         *
         * Fix: If two ? marks are present then replace
the starting ? mark of queryString by &
         */
        if(queryString != null && queryString.length( ) > 0 &&
queryString.startsWith("?") && deepLink.indexOf("?") != -1) {
            queryString = "&" +
queryString.subsring(1);//Get rid of starting ? and then add prefix &
to it
        }
        //add the queryString to the deeplink
        return deepLink + queryString;
    }
    /**
     * A class for content type data source
     */
    static class DeepLinkDataSource implements DataSource
    {
        private byte[ ] mData;
        private String mContentType;
        /**
         * constructor
         * @param dataSource data source
         */
        public DeepLinkDataSource(byte[ ] data, String
contentType)
        {
            mData = data;
            mContentType = contentType;
        }
        /**
         * get content type
         */
        public String getContentType( )
        {
            return mContentType;
        }
        /**
         * get input stream
         */
        public InputStream getInputStream( ) throws
IOException
        {
            return new ByteArrayInputStream(mData);
        }
        /**
         * get output stream
         */
        public OutputStream getOutputStream( ) throws
IOException
        {
            return new ByteArrayOutputStream( );
        }
        /**
         * get data source name
         */
        public String getName( )
        {
            return "DeepLinkDataSource";
        }
    }
}
```

Table 6 is an exemplary pseudo code for creating the class, "NotificationUtil", for generating a method "SendMail" for sending the e-mail message in a messaging environment to users in response to an event, in accordance with one exemplary embodiment of the present invention, as follows.

TABLE 6

"NotificationUtil" Class

```
/**
 * Send Mail
 * @param locator ServiceLocator
 * @param recipients List of recipients
 * @param subject Mail subject
 * @param messageBody Mail Text
 * @param contents Attachments
 * @throws SabaException
 */
public static void sendMail(ServiceLocator locator,
Collection recipients, String subject, String messageBody, Collection
contents) throws SabaException
{
    //get the parameters
    NotifyParamManager paramManager =
(NotifyParamManager) locator.getManager
(Delegates.kNotifyParamManager);
    Collection params =
paramManager.getAllNotifyServerParam( );
    NotifyServerParam param = (NotifyServerParam)
params.iterator( ).next( );
    NotifyServerParamDetail detail =
paramManager.getNotifyServerParamDetail(param);
    //get the smtp info
    String smtpHost = detail.getSMTPServer( );
    int smtpPort =
Integer.parseInt(detail.getSMTPPort( ));
    Collection domainParamList =
paramManager.getAllNotifyServerDomainParam( );
    String replyAddress = "admin@admin.com";
    if ( domainParamList !=null){
        Iterator iter = domainParamList.iterator( );
        while ( iter.hasNext( )){
            NotifyServerDomainParam domainParam =
(NotifyServerDomainParam) iter.next( );
            NotifyServerDomainParamDetail
domainParamDetail =
paramManager.getNotifyServerDomainParamDetail(domainParam);
            String
domainId=domainParamDetail.getDomain( ) .getId( );
            if (
domainId.equals("domin000000000000001")) {
                replyAddress =
domainParamDetail.getReplyToAddress( );
            }
        }
    }
    //reply address
    ArrayList replyTo = new ArrayList( );
    replyTo.add(replyAddress);
    sendMail(smtpHost, smtpPort, replyTo, recipients,
```

TABLE 6-continued

"NotificationUtil" Class

```
subject, messageBody, contents);
   }
   /**
    * Send Mail
    * @param smtpHost SMTP hostname/ip
    * @param smtpPort SMTP port
    * @param replyTo Collection of String of reply to
addresses
    * @param recipients Collection of String of email
addresses
    * @param subject email subject
    * @param messageBody Message Body
    * @param contents Collection of MailContent
    * @throws SabaException
    */
   public static void sendMail(String smtpHost, int smtpPort,
Collection replyTo, Collection recipients, String subject, String
messageBody, Collection contents) throws SabaException
   {
      Properties props = new Properties( );
      props.put(kSMTPHost, smtpHost);
      props.put(kSMTPPort, String.valueOf(smtpPort));
      // create a session object if not yet created
      javax.mail.Session session =
javax.mail.Session.getDefaultInstance(props, null);
      if (session == null)
      {
         throw new
SabaException(PlatformMessage.kMailSessionCreationFailure);
      }
      // turn off debug for this session
      boolean debug = false;
      session.setDebug(debug);
      MimeMessage msg = new MimeMessage(session);
      try
      {
         msg.setSentDate(new Date( ));
      }
      catch (MessagingException e)
      {
         throw new
SabaException(PlatformMessage.kInvalidReplyToAddress);
      }
      if (replyTo != null && replyTo.size( ) != 0)
      {
         try
         {
            InternetAddress[ ] (replyAddrs =
getInternetAddresses(replyTo);
            msg.setFrom(replyAddrs[0]);
            msg.setReplyTo(replyAddrs);
         }
         catch (MessagingException e)
         {
            throw new
SabaException(PlatformMessage.kInvalidReplyToAddress);
         }
      }
      if (recipients == null | | recipients.size( ) == 0)
      {
         throw new
SabaException(PlatformMessage.kMailRecipientMissing);
      }
      try
      {
         msg.setRecipients(javax.mail.Message.Recipient
Type.TO, getInternetAddresses(recipients));
      }
      catch (MessagingException e)
      {
         throw new
SabaException(PlatformMessage.kInvalidRecipientAddress);
      }
      try
      {
         msg.setSubject(subject, kDefaultCharset);
      }
      catch (MessagingException e)
      {
         throw new
SabaException(PlatformMessage.kFailToSetMailSubject);
      }
      try
      {
         Multipart mp = new MimeMultipart( );
         //set the message body
         if(messageBody != null && messageBody.length( )
> 0)
         {
            MimeBodyPart mesgBody = new
MimeBodyPart( );
            mesgBody.setDisposition(Part.INLINE);
            mesgBody.setText(messageBody);
            mp.addBodyPart(mesgBody);
         }
         if (contents != null && !contents.isEmpty( ))
         {
            Iterator iter = contents.iterator( );
            while (iter.hasNext( ))
            {
               MimeBodyPart mbp = new
MimeBodyPart( );
               MailContent content = (MailContent)
iter.next( );
               DataSource dataSource =new
ContentTypeDataSource(content.getDataSource( ), content.getCharset( ));
               mbp.setDataHandler (new
DataHandler(dataSource));
               String disposition =
content.getDisposition( );
               String fileName =
content.getFileName( );
               mbp.setDisposition(disposition);
               if
(disposition.equals(Part.ATTACHMENT) && fileName != null)
               {
                  mbp.setFileName(fileName);
               }
               mp.addBodyPart(mbp);
            }
         }
         msg.setContent(mp);
         msg.saveChanges( );
      }
      catch (MessagingException e)
      {
         throw new
SabaException(PlatformMessage.kFailToSetMailAttachment);
      }
      try
      {
         Transport.send(msg);
      }
      catch (MessagingException mex)
      {
         Exception ex = mex;
         while (ex instanceof MessagingException)
         {
            // Debug.PrintStackTrace ( ex );
            Exception nex = ((MessagingException)
ex) .getNextException( );
            if (nex != null)
            {
               ex =nex;
            }
            else
            {
               throw new SabaException(ex);
            }
         }
         throw new SabaException(ex);
      }
   }
```

Table 7 is an exemplary pseudo code for creating the utility class, "OutlookEmail.xml". This is the template for the hypertext markup language (html) that is embedded in the e-mail notification message, in accordance with one embodiment. The pseudo code of Table 7 generates the I-frame that is used for linking to a particular web page through deep linking.

TABLE 7

"OutlookEmail.xml" Class

```
<html>
<head>
    <title>@EMAILTITLE</title>
    <meta http-equiv="Content-Type" content="text/html; charset=iso-8859-1"/>
    <style type="text/css">
    <!--
.TitleFont {
font-family: Verdana;
font-size: 8pt;
font-weight: 700;
}
.TextFont {
font-family: Verdana;
font-size: 8pt;
}
-->
    </style>
</head>
<body link="336699">
    <SCRIPT LANGUAGE="Javascript">
        document.write("<IFRAME MARGINWIDTH='0' MARGINHEIGHT='0' NAME='results' WIDTH='95%' FRAMEBORDER='0' HEIGHT='1500' SRC='@DEEPLINK' >");
    </SCRIPT>
    <NOSCRIPT>
        <table width="37%" border="0" cellspacing="0" cellpadding="0">
            <tr>
                <td height="21" bgcolor="#e0e0e0" class="TitleFont">
                    <font color="#115599">@EMAILTITLE</font>
                </td>
            </tr>
            <tr>
                <td height="15"/>
            </tr>
            <tr>
                <td height="21" valign="top">
                    <span class="TitleFont">
                        <font color="#555555">@FULLNAME : </font>
                    </span>
                    <span class="TextFont">
                        <font color="#333333">@EMAILTEXT</font>
                    </span>
                </td>
            </tr>
            <tr>
                <td>
                    <font color="#0000CC"> ........................................................................
..</font>
                </td>
            </tr>
            <tr>
                <td>
                    <span class="TitleFont">
                        <font color="#555555">Note :</font>
                    </span>
                    <font color="#333333">
                        <span class="TextFont">Double click and open this message to view the details.</span>
                    </font>
                </td>
            </tr>
        </table>
    </NOSCRIPT>
</body>
```

TABLE 7-continued

"OutlookEmail.xml" Class

```
<body/>
</html>
```

Table 8 is an exemplary pseudo code for creating the class, "deepLinkURLGenerator". This pseudo code generates the deep link URL, as follows.

TABLE 8

"deepLinkURLGenerator" Class

```
*/
package com.saba.notify.javakeyword;
import java.util.ArrayList;
import java.util.Collection;
import java.util.Iterator;
import java.util.List;
import java.util.Map;
import com.saba.exception.PlatformMessage;
import com.saba.exception.SabaException;
import com.saba.locator.ServiceLocator;
import com.saba.notify.IKeywordByName;
import com.saba.properties.SystemProperties;
import com.saba.sys.SabaSite;
import com.saba.web.deeplink.IDeepLinkMetaData;
import com.saba.web.desktop.DesktopUtil;
/**
* DeepLinkURLGenerator - takes care of generating the Deep Link URL for the Given keyword.
*/
public class DeepLinkURLGenerator implements IKeywordByName, IDeepLinkMetaData
{
    /**
     * Constructor
     */
    public DeepLinkURLGenerator( )
    {
        super( );
    }
    /**
     * Get the URL for the Given Keyword
     * @param keywordName name of the keyword
     * @param sourceObjectId id of the source which generated the event
     * @param localeId
     * @param sessionId
     * @return Collection which contains the URL
     */
    public Collection getKeywordValue (String keywordName, String sourceObjectId, String localeId, ServiceLocator locator) throws SabaException
    {
        String deepLinkURL = getInitialURL(locator) + "/" + kDeepLinkIdentifier + "/";
        if(keywordName.equals(kCurrentLearning))
        {
            deepLinkURL += "currentLearning";
        }
        else if(keywordName.equals(kCurrentLearning))
        {
            deepLinkURL += "sample";
        }
        else if(keywordName.equals(kGoalAssigned_Assignee))
        {
            deepLinkURL += kGoalAssigned_Assignee +
                "?id_goalAssignment=" +
                    sourceObjectId +
                "&actionKeyDeepLink= editGoal"+
                "&callerPage=
/performance/goal/listGoals.xml";
        }
        else if(keywordName.equals(kGoalAssigned_Manager))
        {
            deepLinkURL += kGoalAssigned_Manager +
                "?id_goalAssignment=" +
```

TABLE 8-continued

"deepLinkURLGenerator" Class

```
            sourceObjectId +
            "&actionKeyDeepLink=editGoal"+
            "&isManagerDeepLink=true"+
            "&callerPage=
/performance/goal/listGoals.xml";
        }
        else if(keywordName.equals(kGoalAssigned_Manager))
        {
            deepLinkURL += kGoalDue_Assignee +
            "?id_goalAssignment=" +
            sourceObjectId +
            "&actionKeyDeepLink=editGoal"+
            "&callerPage=
/performance/goal/listGoals.xml";
        }
        else if(keywordName.equals(kGoalDue_Manager))
        {
            deepLinkURL += kGoalDue_Manager +
            "?id_goalAssignment=" +
            sourceObjectId +
            "&actionKeyDeepLink=editGoal"+
            "&isManagerDeepLink=true"+
            "&callerPage=
/performance/goal/listGoals.xml";
        }
        // start: review notification deeplinks
        else if(keywordName.equals(kConfigureReview))
        {
            deepLinkURL+= kConfigureReview + "?" +
            "id" + "=" + sourceObjectId +
            "&callbackPage=
/performance/review/ownedReviews.rdf";
        }
        else if(keywordName.equals(kSelfReview))
        {
            deepLinkURL += kSelfReview + "?" +
            "id" + "=" + sourceObjectId +
            "&callbackPage=
/performance/review/myReview.rdf";
        }
        else if(keywordName.equals(kApproveReview))
        {
            deepLinkURL += kApproveReview + "?" +
            "id" + "=" + sourceObjectId +
            "&callbackPage=
/performance/review/approveReviews.rdf";
        }
        // end: review notification deeplinks
        // start: action plan notification deeplinks
        else
if(keywordName.equals(kActionPlanApprovalNeeded))
        {
            deepLinkURL += kActionPlanApprovalNeeded + "?" +
            kWDKOverrideParam + "=true" +
            "&actionPlanId" + "=" + sourceObjectId;
        }
        else
if(keywordName.equals(kAssigneeActiveActionPlanCreated))
        {
            deepLinkURL += kAssigneeActiveActionPlanCreated
+ "?" +
            kWDKOverrideParam + "=true" +
            "&actionPlanId" + "=" + sourceObjectId;
        }
        else if(keywordName.equals(kDraftActionPlanCreated))
        {
            deepLinkURL += kDraftActionPlanCreated + "?" +
            kWDKOverrideParam + "=true" +
            "&actionPlanId" + "=" + sourceObjectId;
        }
        else if(keywordName.equals(kActionPlanActivated))
        {
            deepLinkURL += kActionPlanActivated + "?" +
            kWDKOverrideParam + "=true" +
            "&actionPlanId" + "=" + sourceObjectId;
        }
        else if(keywordName.equals(kActionPlanCancelled))
        {
            deepLinkURL += kActionPlanCancelled + "?" +
            kWDKOverrideParam + "=true" +
            "&actionPlanId" + "=" + sourceObjectId;
        }
        else if(keywordName.equals(kActionPlanCompleted))
        {
            deepLinkURL += kActionPlanCompleted + "?" +
            kWDKOverrideParam + "=true" +
            "&actionPlanId" + "=" + sourceObjectId;
        }
        else if(keywordName.equals(kActionPlanDeactivated))
        {
            deepLinkURL += kActionPlanDeactivated + "?" +
            kWDKOverrideParam + "=true" +
            "&actionPlanId" + "=" + sourceObjectId;
        }
        else if(keywordName.equals(kActionPlanRejected))
        {
            deepLinkURL += kActionPlanRejected + "?" +
            kWDKOverrideParam + "=true" +
            "&actionPlanId" + "=" + sourceObjectId;.
        }
        else if(keywordName.equals(kPrescriptiveGoal))
        {
            deepLinkURL += kPrescriptiveGoal + "?" +
            kWDKOverrideParam + "=true" +
            "&actionPlanId" + "=" + sourceObjectId;
        }
        // end: action plan notification deeplinks
        // start: learning deeplinks
        else if (keywordName.equals(kOfferingDetails))
        {
            deepLinkURL += kOfferingDetails + "?" +
            "offeringId=" + sourceObjectId;
        }
        // end: learning deeplinks
        else if(keywordName.equals(kContentDetailURL))
        {
            deepLinkURL += kContentDetailURL + "?" +
            "registrationId" + "=" +
sourceObjectId;
        }
        else if(keywordName.equals(kMyReviewContentURL))
        {
            deepLinkURL += kMyReviewContentURL + "?" +
            "selectedTab=3" +
            "&negation=false";
        }
        else
if(keywordName.equals(kContentInventoryDetailURL))
        {
            deepLinkURL += kContentInventoryDetailURL + "?" +
            "id" + "=" + sourceObjectId +
            "&actionKey2=true";
        }
        else if(keywordName.equals(kMyGoals))
        {
            deepLinkURL += kMyGoals;
        }
        else if(keywordName.equals(kSuccessionPool))
        {
            deepLinkURL += kSuccessionPool + "?" +
            "id" + "=" + sourceObjectId +
            "&actionKey=edit"+
            "&callerPage=
/talent/talentpool/myOwnedTalentPools.rdf";
        }
        else if(keywordName.equals(kLearningRequest))
        {
            deepLinkURL += kLearningRequest + "?" +
"orderId" + "=" + sourceObjectId;
        }
        else if(keywordName.equals(kOfferingCreated))
        {
            deepLinkURL += kOfferingCreated + "?" +
            "offeringId" + "=" + sourceObjectId;
        }
```

TABLE 8-continued

"deepLinkURLGenerator" Class

```
        else if(keywordName.equals(kOfferedSeat))
        {
            deepLinkURL += kOfferedSeat + "?" +
"registrationId" + "=" + sourceObjectId;
        }
        else if(keywordName.equals(kMRARaterAdded))
        {
            deepLinkURL += kMRARaterAdded + "?" + "raterId"
+ "=" + sourceObjectId;
        }
        else
        {
            deepLinkURL += keywordName;
        }
        //add more else if's here for other URL type keyowords
        List list = new ArrayList (2);
        list.add (deepLinkURL);
        return list;
    }
    /**
    * Get the Initial URL
    * @return String
    */
    protected String getInitialURL(ServiceLocator locator)
throws SabaException
    {
        String locSite =
locator.getSabaPrincipal( ).getSiteName( );
        String siteURL = getURLForSite(locSite);
        if(siteURL == null){
            throw new
SabaException(PlatformMessage.kCannotFindURLForSite, locSite);
        }
        //get the machine URL
        //Fix to the bug CR51947 - move machineURL property
out of deepLinkConfig.xml
        //String machineURL = XMLUtil.getTextValue(root,
kMachineURL);
        String machineURL =
SabaSite.getSystemDefaultSite( ).getSabaProperties
(SystemProperties.kMiscelleniousPropertiesFileName).get
Value(SabaSite.kDeepLinkMachineURLKey);
        if(!machineURL.endsWith("/")){
            machineURL = machineURL + "/";
        }
        return machineURL + siteURL;
    }
    /**
    * Returns URL for site
    *
    * @param site - Site Name
    * @return - URL for given Site Name
    * @throws SabaException
    */
    private String getURLForSite(String siteName) throws
SabaException {
        String deepLinkSiteURL =
SabaSite.get(siteName).getSabaProperties(SabaSite.kWebPropertiesFile).get
Value(SabaSite.kDeeplinkSiteURLKey);
        if(deepLinkSiteURL != null && deepLinkSiteURL.length( ) >0)
            return deepLinkSiteURL;
        Map urlSiteMap = DesktopUtil.getSiteMap( );
        Iterator itr = urlSiteMap.keySet( ).iterator( );
        while(itr.hasNext( )){
            String url = (String)itr.next( );
            String site = (String)urlSiteMap.get(url);
            if(siteName.equals(site)){
                return url;
            }
        }
        return null;
    }
}
```

Table 9 is an exemplary pseudo code for creating the class, "GoalProgressJavaAction". Once the notification engine (e.g., engine 310) discovers an event, the "GoalProgressJavaACtion" java code is invoked. That is, the pseudo code shows how a specific notification message is implemented.

TABLE 9

"GoalProgressJavaAction" Class

```
*/
package com.saba.goal.notify.javaaction;
import java.util.ResourceBundle;
import com.saba.notify.javaaction.OutlookNotifyJavaAction;
import com.saba.exception.SabaException;
import com.saba.web.deeplink.IDeepLinkMetaData;
import com.saba.util.LocaleUtil;
import com.saba.locator.ServiceLocator;
/**
* GoalProgressNotifyJavaAction
*/
public class GoalProgressJavaAction extends
OutlookNotifyJavaAction
{
    /**
    * Default Constrctor
    */
    public GoalProgressJavaAction( )
    {
        super( );
    }
    /**
    * Get the name of the Deeplink
    * @return String
    * @throws SabaEkception
    */
    public String getDeepLinkName( ) throws SabaException
    {
        return IDeepLinkMetaData.kMyGoals;
    }
    /**
    * Get the Subject for the Email
    * @param locator ServiceLocator
    * @return String
    * @throws SabaException
    */
    public String getEmailSubject(ServiceLocator locator)
throws SabaException
    {
        ResourceBundle resourceBundle =
LocaleUtil.getResourceBundle(LocaleUtil.kPerformanceResourceBundle,
locator);
        String emailSubject=
LocaleUtil.getStringFromBundle(resourceBundle,
"kI18nXXXXXXGoalProgressEmailSubject" );
        String prefix=
LocaleUtil.getStringFromBundle(resourceBundle,
"kI18nXXXXXXGoalProgressSabaNote" );
        String subject = prefix + " – " + emailSubject;
        return subject;
    }
    /**
    * Get the Subject for the Email
    * @param locator ServiceLocator
    * @return String
    * @throws SabaException
    */
    public String getEmailTitle(ServiceLocator locator) throws
SabaException
    {
        ResourceBundle resourceBundle =
LocaleUtil.getResourceBundle(LocaleUtil.kPerformanceResourceBundle,
locator);
        String mailBodyHeading =
LocaleUtil.getStringFromBundle(resourceBundle,
"kI18nXXXXXXGoalProgressBodyHeading" );
        // "goal progress"
        return mailBodyHeading;
    }
    /**
    * Get the Email Text
    * @param locator ServiceLocator
    * @return String
    * @throws SabaException
    */
```

TABLE 9-continued

"GoalProgressJavaAction" Class

```
    public String getEmailText(ServiceLocator locator) throws
SabaException
    {
        ResourceBundle resourceBundle =
LocaleUtil.getResourceBundle(LocaleUtil.kPerformanceResourceBundle,
locator);
        String mailBody =
LocaleUtil.getStringFromBundle(resourceBundle,
"kI18nXXXXXGoalProgressBody" );
        // "Update your Goal Progress"
        return mailBody;
    }
}
```

Figure 8:
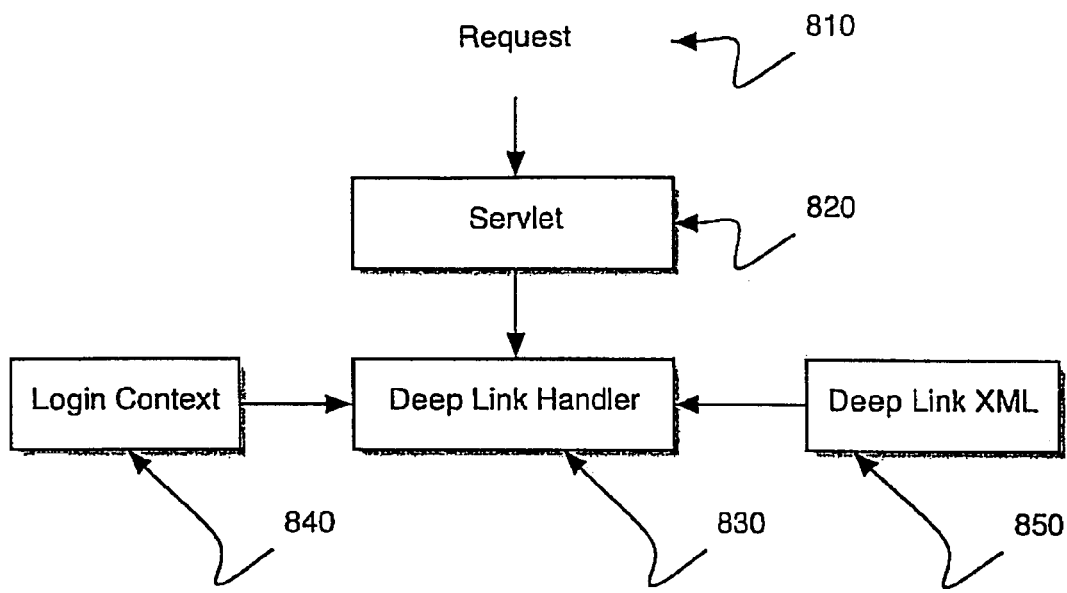
FIG. 8 is a diagram of a deep link architecture that is used to handle deep link requests, in accordance with one embodiment of the present invention.

FIG. 8 is a diagram of a deep link architecture 800 that is used to handle deep link requests, in accordance with one embodiment of the present invention. The deep linking is a generic, consistent and reusable infrastructure that is capable of jumping to any application page from the notification message (e.g., e-mail), other web applications, etc. that is used. The deep link is integrated within the notification message to access any web page.

As shown in FIG. 8, a request 810 is processed by the deep link architecture 800. The request 810 is presented to the architecture 800 through a deep link and is received by the servlet 820. For instance, the servlet architecture with a decorating filter pattern is used to handle all deep link requests. The servlet is able to recognize deep links. In one embodiment, all the deep links are of a similar format. For instance, the deep link are identified by "http://<machine name>/<desktop>/goto/<deepLinkName>".

More specifically, the servlet 820 passes the request to a deep link handler 830, which processes the request 810. More specifically, the servlet 820 delegates requests to one or more handlers depending on the specific type of request.

The deep link handler 830 identifies the user through the login context block 840. More specifically, the deep link handler 830 authenticates the user, as previously described.

The deep link handler is also able to generate the application page URL for the deep link by reading the deep link XML file 850. This deep link XML file 850 is a configuration file that maps the deep link URL to an actual web page, and identifies the parameters for the page.

Tables 10-12 provide examples of the values for the deep link xml file 850 of FIG. 8. For instance, Table 10 is a deep link file that contains all the necessary meta-data for a deep link. The meta-data for the deep link includes the following: a main page that is invoked; a menu item which is activated; a version number; various parameters and their values (e.g., input, dynamic, and static parameters). Every deep link page is registered with the deep link xml file 850. In addition, the deep link handler 830 reads the meta-data from the deep link xml file 850 to generate the URL for the application page that is called.

TABLE 10

Deep Link XML File

```
<?xml version="1.0" encoding="UTF-8"?>
<deepLinkConfig version="1.0">
    <version>1.0</version>
    <deepLink>
        <name>myProfile</name>
        <mainPage>/order/checkOutOrder.saba</mainPage>
        <menuItem>uniqueId</menuItem>
```

TABLE 10-continued

Deep Link XML File

```
        <fixedParameters>
            <param>
                <name>xxxx</name>
                <value>xxxx</value>
            </param>
            <param>
                <name>xxxx</name>
                <value>xxxx</value>
            </param>
        </fixedParameters>
    </deepLink>
    <deepLink>
        <name>myProfile</name>
        <mainPage>/order/checkOutOrder.saba</mainPage>
        <menuItem>uniqueId</menuItem>
    </deepLink>
</deepLinkConfig>
```

Table 11 is the XML Schema definition for the deep link metadata file.

TABLE 11

Deep Link XML Schema

```
<?xml version="1.0" encoding="UTF-8"?>
<!--W3C Schema generated by XML Spy v4.0 U
(http://www.xmlspy.com)-->
<xs:schema xmlns:xs="http://www.w3.org/2001/XMLSchema"
elementFormDefault="qualified">
    <xs:element name="deepLinkConfig">
        <xs:complexType>
            <xs:sequence>
                <xs:element name="deepLink" type="deepLinkType"
maxOccurs="unbounded"/>.
            </xs:sequence>
        </xs:complexType>
    </xs:element>
    <xs:complexType name="deepLinkType">
        <xs:sequence>
            <xs:element name="name" type="xs:string"/>
            <xs:element name="mainPage" type="xs:string"/>
            <xs:element name="menuItem" type="xs:string"/>
            <xs:element name="fixedParameters"
type="fixedParametersType" minOccurs="0"/>
        </xs:sequence>
    </xs:complexType>
    <xs:complexType name="fixedParametersType">
        <xs:sequence>
            <xs:element name="param" type="paramType"
maxOccurs="unbounded"/>
        </xs:sequence>
    </xs:complexType>
    <xs:complexType name="paramType">
        <xs:sequence>
            <xs:element name="name" type="xs:string"/>
            <xs:element name="value" type="xs:string"/>
        </xs:sequence>
    </xs:complexType>
</xs:schema>
```

FIG. 9 is a chart 900 that illustrates the parameters of a particular deep link, in accordance with one embodiment of the present invention. For instance, the chart 900 includes the name of the deep link, the page associated with the deep link, the active menu item for that page, and additional optional parameters for the page.

Table 12 provides an example of the deep link metadata definition used for the goal progress e-mail as previously presented in various tables.

TABLE 12

Deep Link "Goal Progress Email"

```
<deepLink>
    <name>MyGoals</name>
    <menuItem>My Goals</menuItem>
    <mainPage>/performance/goal/desktop/myGoals.rdf</mainPage>
</deepLink>
```

Accordingly, various embodiments of the present invention disclose a method and system for supporting interaction with a back end server application that is pushed onto a user of the system. That is, information is presented to a user automatically at an appropriate time within a messaging environment. In embodiments of the present invention, the message that is presented also enables the user to take action within the back end server application without having the user directly open the back end server application. As a result, embodiments of the present invention provide timely and seamless interfacing with a back end server application.

While the methods of embodiments illustrated in flow charts 400 and 700 show specific sequences and quantity of steps, the present invention is suitable to alternative embodiments. For example, not all the steps provided for in the method are required for the present invention. Furthermore, additional steps can be added to the steps presented in the present embodiment. Likewise, the sequences of steps can be modified depending upon the application.

Embodiments of the present invention, a method and system for testing network configurations using a common test interface are described. While the invention is described in conjunction with the preferred embodiments, it is understood that they are not intended to limit the invention to these embodiments. On the contrary, the invention is intended to cover alternatives, modifications and equivalents, which may be included within the spirit and scope of the invention as defined by the appended claims. Furthermore, in the detailed description of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the present invention.

What is claimed is:

1. A method comprising:
a back end server determining when an event occurs associated with a back end server application, said back end server comprises said back end server application;
said back end server generating a notification message for informing a human user of said event that occurred, said notification message comprising a link to a web page of said back end server application, said link comprising an authentication certificate that is associated with an expiration time;
said back end server rendering said notification message to comply with a format supporting a messaging environment;
said back end server sending via the internet said notification message that is rendered to an electronic device associated with said human user to facilitate interfacing between said human user and said back end server application, said notification message comprising a visible list of a plurality of employee goals and a plurality of visible statuses, each of said plurality of visible statuses corresponds to one of said plurality of employee goals, said plurality of employee goals are associated with said human user, said notification message comprising a percentage completed corresponding to one of said plurality of employee goals;
a link assignor of said back end server receiving a request associated with said link from said electronic device;
said link assignor assigning said request to a link handler of said back end server;
said link handler determining if said authentication certificate of said link has expired;
if said authentication certificate has not expired, said link handler authenticating said human user by bypassing a login process;
if said authentication certificate has expired, said back end server presenting a login screen to said human user via the internet;
if said human user is authenticated, said link handler processing said request by reading a link file of the back end server to generate a universal resource locator (URL) for said web page, the link file further identifies parameters for said web page;
selecting a visible status of said plurality of visible statuses; and
after said selecting said visible status, displaying a window in said notification message that enables said human user to update progress of an employee goal corresponding to said visible status.

2. The method of claim 1, wherein said event comprises a periodic event used to track progress of at least one employee goal of said human user.

3. The method of claim 2, wherein said back end server generating a notification message further comprises:
identifying said human user from a plurality of human users supported by said back end server application, wherein said human user is associated with said periodic event;
providing access to a detailed description of an employee goal;
determining a message address for said human user; and
generating said notification message for said human user at a message address.

4. The method of claim 1, wherein said event comprises a singular event used to promote learning of said human user and occurs within an operation of said back end server application, and wherein said back end server generating a notification message further comprises:
identifying said human user from a plurality of human users supported by said back end server application, wherein said human user is associated with said singular event;
determining a message address for said human user; and
generating said notification message for said human user at a message address.

5. The method of claim 4, wherein said event comprises an offer for a created class, and wherein said back end server rendering said notification message further comprises:
providing access to a catalogue of classes applicable to said human user through said web page of said back end server application, wherein said web page enables said human user to register for a class selected by said human user.

6. The method of claim 4, wherein said event comprises a prescribed class assigned to said human user within a particular time period, and wherein said back end server rendering said notification message further comprises:

enabling said human user to register for said prescribed class through a web page of said back end server application.

7. The method of claim 4, wherein said event comprises a registration for a class by a person needing authorization by said human user, and wherein said notification message further comprises:
   a visible rejection button for denying authorization to register for said class by said human user; and
   a visible approve button for approving authorization to register for said class by said human user.

8. The method of claim 4, wherein said event comprises an opening on a waitlist for a class, wherein said human user was listed on said waitlist, and wherein said notification message further comprises:
   a visible registration button for accessing a web page of said back end server for registering for said class; and
   a visible decline button for accessing a web page of said back end server for declining registration for said class.

9. The method of claim 4, wherein said event comprises a prescribed registration for a web based training class, and wherein said link launches said web based training class.

10. The method of claim 1, wherein said notification message further comprises:
   a visible action button for accessing a web page of said back end server application that services said action when said human user wants to take said action, wherein active content from said web page is displayed through an inline frame of said message when said visible action button is engaged.

11. The method of claim 1, wherein said event comprises registering for a class, wherein said notification message further comprises:
   a visible accept button that automatically registers said human user for the class when invoked.

12. The method of claim 1, wherein said notification message is an e-mail, and said messaging environment is an e-mail messaging environment.

13. The method of claim 1, wherein said notification message comprises a start date and end date for one of said plurality of employee goals.

14. A back end server comprising:
   a processor;
   a memory coupled to said processor;
   a back end server application;
   a notification module for generating a notification message for informing a human user of an event associated with said back end server application, said event allows for an action, in response to said event, to be taken by a human user through a web page of said back end server application, said notification message comprising a link to said web page, said link comprising an authentication certificate that is associated with an expiration time, said notification module also for sending said notification message through a messaging environment that is rendered to an electronic device associated with said human user, said notification message comprising a visible list of a plurality of employee goals and a plurality of visible statuses, each of said plurality of visible statuses corresponds to one of said plurality of employee goals, said plurality of employee goals are associated with said human user, after a visible status is selected a window is displayed in said notification message that enables said human user to update progress of an employee goal corresponding to said visible status, said notification message comprising a percentage completed corresponding to one of said plurality of employee goals;
   a rendering module for rendering said notification message to comply with a format supporting said messaging environment, said notification message that is rendered enables said human user via said link to take said action via the internet without having said human user directly open said back end server application;
   a link assignor for receiving a request associated with said link from said electronic device, said link assignor for assigning said request to a link handler of said back end server; and
   said link handler for determining if said authentication certificate of said link has expired; said link handler for authenticating said human user by bypassing a login process if said authentication certificate has not expired, said back end server for presenting a login screen to said human user via the internet if said authentication certificate has expired, said link handler for processing said request by reading a link file of the back end server to generate a universal resource locator (URL) for said web page if said human user is authenticated, the link file further identifies parameters for said web page.

15. The back end server of claim 14, wherein said notification module is for determining when said event occurs.

16. The back end server of claim 14, wherein said notification message that is rendered comprises:
   a visible action button for accessing a web page of said back end server application, said web page services said action when said human user wants to take said action, and active content from said web page is displayed through an inline frame of said message when said visible action button is engaged.

17. The back end server of claim 14, wherein said notification message that is rendered comprises:
   a visible action button that provides a link to said web page of said back end server application, said web page services said action when said human user wants to take said action.

18. The back end server of claim 14, wherein said notification message that is rendered comprises:
   a percentage completed corresponding to each of said plurality of employee goals.

19. The back end server of claim 14, wherein said notification message that is rendered comprises:
   a start date and end date for one of said plurality of employee goals.

20. The back end server of claim 14, wherein said notification message that is rendered comprises:
   a visible acceptance button for initializing registration for a prescribed class through a web page in said back end server; and
   a visible rejection button for declining said registration.

21. A back end server comprising:
   a processor; and
   a computer-readable memory coupled to said processor and containing program instructions that, when executed, implement a method for interfacing with a back end server application through a messaging environment, said method comprising:
   said back end server determining when an event occurs associated with said back end server application, said back end server comprises said back end server application;
   said back end server generating a notification message for informing a human user of said event that occurred, said notification message comprising a link to a web page of said back end server application, said link comprising an authentication certificate that is associated with an expiration time;
said back end server rendering said notification message to comply with a format supporting said messaging environment;
said back end server sending via the internet said notification message that is rendered to an electronic device associated with said human user to facilitate interfacing between said human user and said back end server application, said notification message comprising a visible list of a plurality of employee goals and a plurality of visible statuses, each of said plurality of visible statuses corresponds to one of said plurality of employee goals, said plurality of employee goals are associated with said human user, said notification message comprising a percentage completed corresponding to one of said plurality of employee goals;
a link assignor of said back end server receiving a request associated with said link from said electronic device;
said link assignor assigning said request to a link handler of said back end server;
said link handler determining if said authentication certificate of said link has expired;
if said authentication certificate has not expired, said link handler authenticating said human user by bypassing a login process;
if said authentication certificate has expired, said back end server presenting a login screen to said human user via the internet;
if said human user is authenticated, said link handler processing said request by reading a link file of the back end server to generate a universal resource locator (URL) for said web page, the link file further identifies parameters for said web page; and
after a visible status is selected, said back end server displaying a window in said notification message that enables said human user to update progress of an employee goal corresponding to said visible status.

22. The back end server of claim 21, wherein said event comprises a periodic event used to track progress of at least one employee goal of said human user.

23. The back end server of claim 22, wherein said back end server generating a notification message in said method further comprises:
identifying said human user from a plurality of human users supported by said back end server application, said human user is associated with said periodic event;
providing access to a detailed description of said at least one employee goal;
determining a message address for said human user; and
generating said notification message for said human user at a message address.

24. The back end server of claim 21, wherein said event comprises a singular event used to promote learning of said human user and occurs within an operation of said back end server application, and said back end server generating a notification message in said method further comprises:
identifying said human user from a plurality of human users supported by said back end server application, said human user is associated with said singular event;
determining a message address for said human user; and
generating said notification message for said human user at a message address.

25. The back end server of claim 24, wherein said event comprises an offer for a created class, and said back end server rendering said notification message in said method further comprises:
providing access to a catalogue of classes applicable to said human user through a web page of said back end server application, said web page enables said human user to register for a class selected by said human user.

26. The back end server of claim 24, wherein said event comprises a prescribed class assigned to said human user within a particular time period, and said back end server rendering said notification message in said method further comprises:
enabling said human user to register for said prescribed class through a web page of said back end server application.

27. The back end server of claim 24, wherein said event comprises a registration for a class by a person needing authorization by said human user, and said notification message in said method further comprises:
a visible rejection button for denying authorization to register for said class by said human user; and
a visible approve button for approving authorization to register for said class by said human user.

28. The back end server of claim 24, wherein said event comprises an opening on a waitlist for a class, said human user was listed on said waitlist, and said notification message in said method further comprises:
a visible registration button for accessing a web page of said back end server for registering for said class; and
a visible decline button for accessing a web page of said back end server for declining registration for said class.

29. The back end server of claim 24, wherein said event comprises a prescribed registration for a web based training class, and said link launches said web based training class.

30. The back end server of claim 21, wherein said notification message further comprises:
a visible action button for accessing a web page of said back end application that services said action when said human user wants to take said action, active content from said web page is displayed through an inline frame of said message when said visible action button is engaged.

31. The back end server of claim 21, wherein said event comprises registering for a class, said notification message further comprises:
a visible accept button that automatically registers said human user for the class when invoked.

32. The back end server of claim 21, wherein said notification message complies with a calendaring format, and said messaging environment is a calendaring environment.

33. The back end server of claim 23, wherein said detailed description comprising a start date and end date for said employee goal.

* * * * *